US011051318B2

(12) United States Patent
Yoshimura et al.

(10) Patent No.: US 11,051,318 B2
(45) Date of Patent: Jun. 29, 2021

(54) TERMINAL APPARATUS, BASE STATION APPARATUS, AND COMMUNICATION METHOD

(71) Applicants: Sharp Kabushiki Kaisha, Sakai (JP); FG Innovation Company Limited, Tuen Mun (HK)

(72) Inventors: Tomoki Yoshimura, Sakai (JP); Shoichi Suzuki, Sakai (JP); Wataru Ouchi, Sakai (JP); Liqing Liu, Sakai (JP); Kimihiko Imamura, Sakai (JP)

(73) Assignees: SHARP KABUSHIKI KAISHA, Sakai (JP); FG Innovation Company Limited, Tuen Mun (HK)

( * ) Notice: Subject to any disclaimer, the term of this patent is extended or adjusted under 35 U.S.C. 154(b) by 0 days.

(21) Appl. No.: 16/345,283

(22) PCT Filed: Nov. 1, 2017

(86) PCT No.: PCT/JP2017/039565
§ 371 (c)(1),
(2) Date: Apr. 26, 2019

(87) PCT Pub. No.: WO2018/084183
PCT Pub. Date: May 11, 2018

(65) Prior Publication Data
US 2019/0274149 A1    Sep. 5, 2019

(30) Foreign Application Priority Data

Nov. 2, 2016 (JP) .............................. JP2016-214931

(51) Int. Cl.
*H04W 72/12* (2009.01)
*H04L 1/00* (2006.01)
(Continued)

(52) U.S. Cl.
CPC ....... *H04W 72/1231* (2013.01); *H04L 1/0026* (2013.01); *H04L 1/1819* (2013.01);
(Continued)

(58) Field of Classification Search
CPC . H04W 72/1231; H04W 24/10; H04W 72/04; H04W 72/042; H04W 72/0446;
(Continued)

(56) References Cited

U.S. PATENT DOCUMENTS

2011/0299484 A1* 12/2011 Nam ................... H04L 5/0057
370/329
2014/0044083 A1 2/2014 Kim et al.
(Continued)

OTHER PUBLICATIONS

"3rd Generation Partnership Project; Technical Specification Group Radio Access Network; Evolved Universal Terrestrial Radio Access (E-UTRA); Physical channels and modulation (Release 13)", 3GPP TS 36.211 V13.1.0, Mar. 2016, pp. 1-155.
(Continued)

*Primary Examiner* — Laut Phung
(74) *Attorney, Agent, or Firm* — ScienBiziP, P.C.

(57) ABSTRACT

A terminal apparatus includes a receiver configured to receive a DCI format including an uplink grant, and a transmitter configured to transmit a PUSCH or an sPUSCH based on the uplink grant. A TTI of the PUSCH is one sub-frame. A TTI of the sPUSCH is shorter in value than one slot. In a case that a transmission of a channel quality indicator is triggered in response to a transmission of the PUSCH, the uplink control information is transmitted in the PUSCH. In a case that a transmission of a channel quality indicator is triggered in response to a transmission of the sPUSCH, a transmission of the uplink control information is dropped.

16 Claims, 13 Drawing Sheets

(51) Int. Cl.
  *H04L 1/18* (2006.01)
  *H04L 27/26* (2006.01)
  *H04L 5/00* (2006.01)
  *H04W 72/04* (2009.01)
  *H04W 72/14* (2009.01)
  *H04W 24/10* (2009.01)

(52) U.S. Cl.
  CPC .......... *H04L 5/0055* (2013.01); *H04L 5/0057* (2013.01); *H04L 5/0083* (2013.01); *H04L 27/26* (2013.01); *H04L 27/2636* (2013.01); *H04W 24/10* (2013.01); *H04W 72/04* (2013.01); *H04W 72/042* (2013.01); *H04W 72/0446* (2013.01); *H04W 72/14* (2013.01)

(58) Field of Classification Search
  CPC .... H04W 72/14; H04L 1/0026; H04L 1/1819; H04L 5/0055; H04L 5/0057; H04L 5/0083; H04L 27/26; H04L 27/2636
  See application file for complete search history.

(56) References Cited

U.S. PATENT DOCUMENTS

| | | | | |
|---|---|---|---|---|
| 2017/0318575 | A1* | 11/2017 | Park | H04L 1/1896 |
| 2018/0110042 | A1* | 4/2018 | Chen | H04W 72/0413 |
| 2019/0007182 | A1* | 1/2019 | Li | H04L 1/1854 |
| 2019/0028162 | A1* | 1/2019 | Lee | H04L 1/1861 |
| 2019/0132104 | A1* | 5/2019 | Lee | H04L 1/18 |

OTHER PUBLICATIONS

"3rd Generation Partnership Project; Technical Specification Group Radio Access Network; Evolved Universal Terrestrial Radio Access (E-UTRA); Multiplexing and channel coding (Release 13)", 3GPP TS 36.212 V13.1.0, Mar. 2016, pp. 1-129.
"3rd Generation Partnership Project; Technical Specification Group Radio Access Network; Evolved Universal Terrestrial Radio Access (E-UTRA); Physical layer procedures (Release 13)", 3GPP TS 36.213 V13.1.1, Mar. 2016, pp. 1-361.
"3rd Generation Partnership Project; Technical Specification Group Radio Access Network; Evolved Universal Terrestrial Radio Access (E-UTRA) and Evolved Universal Terrestrial Radio Access Network (E-UTRAN); Overall Description; Stage 2 (Release 13)", 3GPP TS 36.300 V13.2.0, Dec. 2015, pp. 1-290.
Ericsson et al., "New SI proposal: Study on Latency reduction techniques for LTE", 3GPP TSG RAN Meeting #67, RP-150465, Mar. 9-12, 2015, 7 pages.
Ericsson, "Physical layer aspects for PUSCH for short TTI", 3GPP TSG RAN WG1 Meeting #84 bis, R1-163320, Apr. 11-15, 2016, pp. 1-3.
Ericsson: "UCI on sPUSCH with short TTI", 3GPP Draft; R1-1610473, 3rd Generation Partnership Project (3GPP), Mobile Competence Centre; 650, Route Des Lucioles; F-06921 Sophia-Antipolis Cedex; France, vol. RAN WG1, No. Lisbon, Portugal; Oct. 10, 2016-Oct. 14, 2016, Oct. 18, 2016 (Oct. 18, 2016), XP051160565, Retrieved from the Internet: URL:http://www.3gpp.org/ftp/tsg_ran/WG1_RL1/TSGR1_86b/Docs/ [retrieved on Oct. 18, 2016] *the whole document*.
NTT Docomo et al: "sPUSCH for shortened TTI", 3GPP Draft; R1-1610048, 3rd Generation Partnership Project (3GPP), Mobile Competence Centre; 650, Route Des Lucioles; F-06921 Sophia-Antipolis Cedex; France, vol. RAN WG1, No. Lisbon, Portugal; Oct. 10, 2016-Oct. 14, 2016, Oct. 9, 2016 (Oct. 9, 2016), XP051150073, Retrieved from the Internet: URL:http://www.3gpp.org/ftp/Meeings_3GPP_SYNC/RAN1/Docs/ [retrieved on Oct. 9, 2016] *the whole document*.

* cited by examiner

| $I_{offset}^{CQI}$ | $\beta_{offset}^{CQI}$ for PUSCH | $\beta_{offset}^{CQI}$ for sPUSCH |
|---|---|---|
| 0 | reserved | 0.500 |
| 1 | reserved | 0.750 |
| 2 | 1.125 | 0.800 |
| 3 | 1.250 | 0.900 |
| 4 | 1.375 | 1.000 |
| 5 | 1.625 | 1.125 |
| 6 | 1.750 | 1.250 |
| 7 | 2.000 | 1.375 |
| 8 | 2.250 | 1.625 |
| 9 | 2.500 | 1.750 |
| 10 | 2.875 | 2.000 |
| 11 | 3.125 | 2.100 |
| 12 | 3.500 | 2.200 |
| 13 | 4.000 | 2.500 |
| 14 | 5.000 | 3.000 |
| 15 | 6.250 | 5.000 |

FIG. 13

TERMINAL APPARATUS, BASE STATION APPARATUS, AND COMMUNICATION METHOD

TECHNICAL FIELD

The present invention relates to a terminal apparatus, a base station apparatus, and a communication method.

This application claims priority based on JP 2016-214931 filed on Nov. 2, 2016, the contents of which are incorporated herein by reference.

BACKGROUND ART

A radio access method and a radio network for cellular mobile communications (hereinafter, referred to as "Long Term Evolution (LTE)", or "Evolved Universal Terrestrial Radio Access (EUTRA)") have been studied in the 3rd Generation Partnership Project (3GPP). In LTE, a base station apparatus is also referred to as an evolved NodeB (eNodeB), and a terminal apparatus is also referred to as a User Equipment (UE). LTE is a cellular communication system in which multiple areas are deployed in a cellular structure, with each of the multiple areas being covered by a base station apparatus. A single base station apparatus may manage a plurality of cells.

The specifications of LTE release 13 include that a physical uplink shared channel (PUSCH) and a physical uplink control channel (PUCCH) transmit uplink control information (NPL 1, NPL 2, NPL 3, and NPL 4). In NPL 5, reduction of a Transmission Time Interval (TTI) and a processing time has been studied. In NPL 6, whether a shortened physical uplink control channel (sPUCCH) and a shortened physical uplink shared channel (sPUSCH) transmit channel state information and Hybrid Automatic Repeat reQuest-ACKnowledgement (HARQ-ACK) has been studied.

CITATION LIST

Non Patent Literature

NPL 1: "3GPP TS 36.211 V13.1.0 (2016-03)", 29 Mar. 2016.

NPL 2: "3GPP TS 36.212 V13.1.0 (2016-03)", 29 Mar. 2016.

NPL 3: "3GPP TS 36.213 V13.1.1 (2016-03)", 31 Mar. 2016.

NPL 4: "3GPP TS 36.300 V13.2.0 (2015-12)", 13 Jan. 2015.

NPL 5: "New SI proposal: Study on Latency reduction techniques for LTE", RP-150465, Ericsson, Huawei, 3GPP TSG RAN Meeting #67, Shanghai, China, 9-12 Mar. 2015.

NPL 6: "Physical layer aspects for PUSCH for short TTI", R1-163320, Ericsson, 3GPP TSG RAN WG1 Meeting #84 bis, Busan, 11-15 Apr. 2016.

SUMMARY OF INVENTION

Technical Problem

An aspect of the present invention provides a terminal apparatus capable of efficiently transmitting uplink control information, a communication method used for the terminal apparatus, a base station apparatus capable of efficiently receiving uplink control information, and a communication method used for the base station apparatus.

Solution to Problem (1) A first aspect of the present invention is a terminal apparatus including a receiver configured to receive a DCI format including an uplink grant, and a transmitter configured to transmit a PUSCH or an sPUSCH based on the uplink grant. A TTI of the PUSCH is one sub-frame. A TTI of the sPUSCH is shorter in value than one slot. In a case that a transmission of a channel quality indicator is triggered in response to a transmission of the PUSCH, the uplink control information is transmitted in the PUSCH. In a case that a transmission of a channel quality indicator is triggered in response to a transmission of the sPUSCH, a transmission of the uplink control information is dropped.

(2) A second aspect of the present invention is a base station apparatus including a transmitter configured to transmit a DCI format including an uplink grant, and a receiver configured to receive a PUSCH or an sPUSCH to be transmitted based on the uplink grant. A TTI of the PUSCH is one sub-frame. A TTI of the sPUSCH is shorter in value than one slot. In a case that a transmission of a channel quality indicator is triggered in response to a transmission of the PUSCH, the uplink control information is transmitted in the PUSCH. In a case that a transmission of a channel quality indicator is triggered in response to a transmission of the sPUSCH, a transmission of the uplink control information is dropped.

(3) A third aspect of the present invention is a communication method used for a terminal apparatus, including receiving a DCI format including an uplink grant, and transmitting a PUSCH or an sPUSCH based on the uplink grant. A TTI of the PUSCH is one sub-frame. A TTI of the sPUSCH is shorter in value than one slot. In a case that a transmission of a channel quality indicator is triggered in response to a transmission of the PUSCH, the uplink control information is transmitted in the PUSCH. In a case that a transmission of a channel quality indicator is triggered in response to a transmission of the sPUSCH, a transmission of the uplink control information is dropped.

(4) A fourth aspect of the present invention is a communication method used for a base station apparatus, including transmitting a DCI format including an uplink grant, and receiving a PUSCH or an sPUSCH to be transmitted based on the uplink grant. A TTI of the PUSCH is one sub-frame. A TTI of the sPUSCH is shorter in value than one slot. In a case that a transmission of a channel quality indicator is triggered in response to a transmission of the PUSCH, the uplink control information is transmitted in the PUSCH. In a case that a transmission of a channel quality indicator is triggered in response to a transmission of the sPUSCH, a transmission of the uplink control information is dropped.

Advantageous Effects of Invention

According to an aspect of the present invention, a terminal apparatus can efficiently transmit uplink control information. In addition, a base station apparatus can efficiently receive uplink control information.

BRIEF DESCRIPTION OF DRAWINGS

FIG. 13 is an example of values of $\beta^{CQI}_{offset}$ according to an aspect of the present embodiment.

DESCRIPTION OF EMBODIMENTS

Embodiments of the present invention will be described below.

Figure 1:
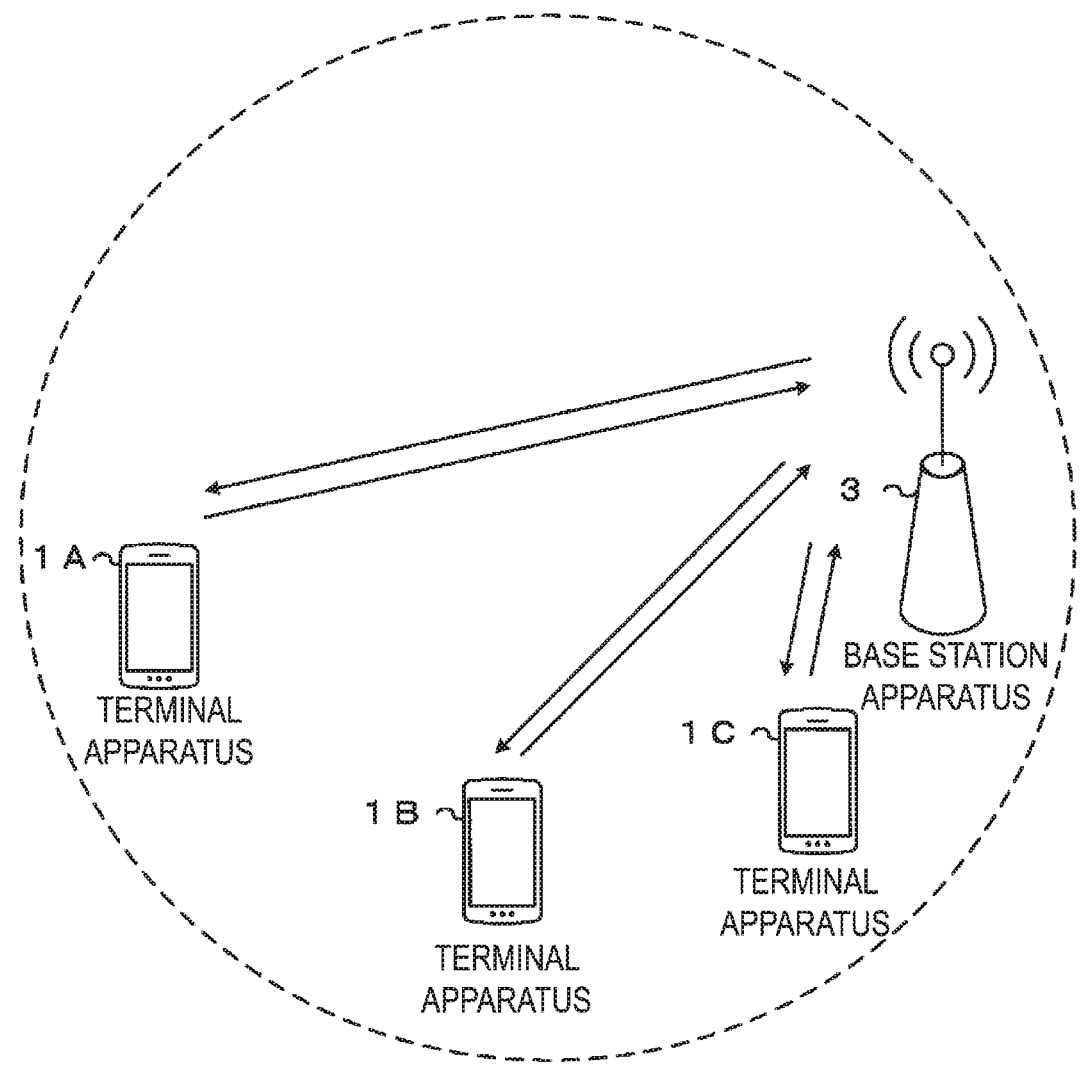
FIG. 1 is a conceptual diagram of a radio communication system according to a present embodiment.

FIG. 1 is a conceptual diagram of a radio communication system according to the present embodiment. In FIG. 1, a radio communication system includes terminal apparatuses 1A to 1C and a base station apparatus 3. The terminal apparatuses 1A to 1C are each referred to as a terminal apparatus 1.

Hereinafter, carrier aggregation will be described.

According to the present embodiment, a plurality of serving cells may be configured for the terminal apparatus 1. A technology in which the terminal apparatus 1 communicates via the plurality of serving cells is referred to as cell aggregation or carrier aggregation. An aspect of the present invention may be applied to each of the plurality of serving cells configured for the terminal apparatus 1. Furthermore, an aspect of the present invention may be applied to some of the plurality of serving cells configured. Furthermore, an aspect of the present invention may be applied to each of groups of some of the plurality of serving cells configured. Furthermore, an aspect of the present invention may be applied to some of the groups of the plurality of serving cells configured.

The plurality of serving cells includes at least one primary cell. Here, the plurality of serving cells may include at least one of a plurality of secondary cells. The primary cell is a serving cell in which an initial connection establishment procedure has been performed, a serving cell in which a connection re-establishment procedure has been started, or a cell indicated as a primary cell in a handover procedure. The secondary cell may be configured at a point of time when or after a Radio Resource Control (RRC) connection is established.

A carrier corresponding to a serving cell in the downlink is referred to as a downlink component carrier. A carrier corresponding to a serving cell in the uplink is referred to as an uplink component carrier. The downlink component carrier and the uplink component carrier are collectively referred to as a component carrier.

The terminal apparatus 1 can perform simultaneous transmission and/or reception on a plurality of physical channels in a plurality of serving cells (component carriers). A single physical channel is transmitted in a single serving cell (component carrier) out of the plurality of serving cells (component carriers).

Physical channels and physical signals according to the present embodiment will be described.

In FIG. 1, in uplink radio communication from the terminal apparatus 1 to the base station apparatus 3, the following uplink physical channels are used. The uplink physical channels are used for transmitting information output from a higher layer.

Physical uplink control channel (PUCCH)
shortened Physical uplink control channel (sPUCCH)
Physical uplink shared channel (PUSCH)
shortened Physical uplink shared channel (sPUSCH)

The PDCCH and the sPUCCH are used to transmit Uplink control information (UCI). In other words, the terminal apparatus 1 may transmit a PUCCH on the primary cell only. The uplink control information includes: downlink channel state information (CSI); a scheduling request (SR) indicating a request for a PUSCH resource; and a hybrid automatic repeat request acknowledgement (HARQ-ACK) for downlink data (a transport block, a medium access control protocol data unit (MAC PDU), a downlink-shared channel (DL-SCH), or a physical downlink shared channel (PDSCH)). The HARQ-ACK indicates an acknowledgement (ACK) or a negative-acknowledgement (NACK). The HARQ-ACK is also referred to as ACK/NACK, HARQ feedback, HARQ-ACK feedback, HARQ acknowledgment, HARQ-ACK acknowledgment, HARQ information, HARQ-ACK information, HARQ control information, or HARQ-ACK control information.

The PUSCH may be a channel used to transmit at least uplink data. The PUSCH may have a length of 1 ms (or, 0.5 ms). The sPUSCH may be a channel used to transmit at least uplink data. The sPUSCH may have a length shorter than 1 ms (or, 0.5 ms). The PUSCH may be a slot. The sPUSCH may be a mini-slot. The sPUSCH may be a sub-slot. At least some of slot, mini-slot, and, sub-slot may each serve as a unit of resource allocation.

The channel state information may include a Channel Quality Indicator (CQI). The channel state information may include a Precoding Matrix Indicator (PMI). The channel state information may include a Rank Indicator (RI). The channel quality indicator and the precoding matrix indicator are collectively referred to as channel quality indicator. The channel state information may include a CSI-RS Resource Indicator (CRI). The rank indicator and the CSI-RS resource indicator may be collectively referred to as rank indicator.

The PUSCH and the sPUSCH may be used to transmit uplink data (Transport block, Medium Access Control Protocol Data Unit (MAC PDU, or Uplink-Shared Channel (UL-SCH)). Furthermore, the PUSCH may be used to transmit the HARQ-ACK and/or channel state information along with the uplink data. Furthermore, the PUSCH may be used to transmit only the channel state information or to transmit only the HARQ-ACK and the channel state information. The uplink data is also referred to as transport block.

An aperiodic channel state information report will be triggered by a field included in an uplink grant corresponding to a PUSCH/sPUSCH transmission. A periodic channel state information report will be triggered by RRC signaling (higher layer parameter). The PUSCH is used for an aperiodic channel state information report. The PUSCH or the PUCCH is used for a periodic channel state information report.

In FIG. 1, the following downlink physical channels are used for downlink radio communication from the base station apparatus 3 to the terminal apparatus 1. The downlink physical channels are used for transmitting information output from the higher layer.

Physical downlink control channel (PDCCH)
Enhanced physical downlink control channel (EPDCCH)
shortened Physical downlink control channel (sPDCCH)
Physical downlink shared channel (PDSCH)
shortened Physical downlink shared channel (sPDSCH)

The PDCCH, the EPDCCH, and the sPDCCH are used for transmitting Downlink Control Information (DCI). The downlink control information is also referred to as DCI format. The downlink control information includes a downlink grant and an uplink grant. The downlink grant is also referred to as downlink assignment or downlink allocation. The downlink control information may include information used to set a resource to be set with the sPDCCH. The downlink control information may include information triggering a blind detection. The downlink control information may include information triggering a blind detection for the sPDCCH.

A single downlink grant may be used for scheduling a single PDSCH within a single cell. A downlink grant may be used for scheduling a PDSCH within a sub-frame to which the downlink grant is transmitted. A single downlink grant may be used for scheduling a single sPDSCH within a single cell. A downlink grant may be used for scheduling an sPDSCH within a shortened Transmission Time Interval (sTTI) to which the downlink grant is transmitted.

A single uplink grant may be used for scheduling a single PUSCH within a single cell. An uplink grant may be used for scheduling a single PUSCH within a fourth or later sub-frame from a sub-frame to which the uplink grant is transmitted. A single uplink grant may be used for scheduling a single sPUSCH within a single cell. An uplink grant is used for scheduling a single sPUSCH within a later sTTI from a sTTI to which the uplink grant is transmitted.

The PDSCH and the sPDSCH are used to transmit downlink data (DownLink Shared CHannel: DL-SCH).

The UL-SCH and the DL-SCH are transport channels. A channel used in a Medium Access Control (MAC) layer is referred to as a transport channel. A unit of the transport channel used in the MAC layer is also referred to as a transport block (TB) or a MAC Protocol Data Unit (PDU). A Hybrid Automatic Repeat reQuest (HARQ) is controlled for each transport block in the MAC layer. The transport block is a unit of data that the MAC layer delivers to the physical layer. In the physical layer, the transport block is mapped to a codeword, and modulation processing and coding processing are performed for each codeword. One physical channel is mapped to one or more layers.

Figure 2:
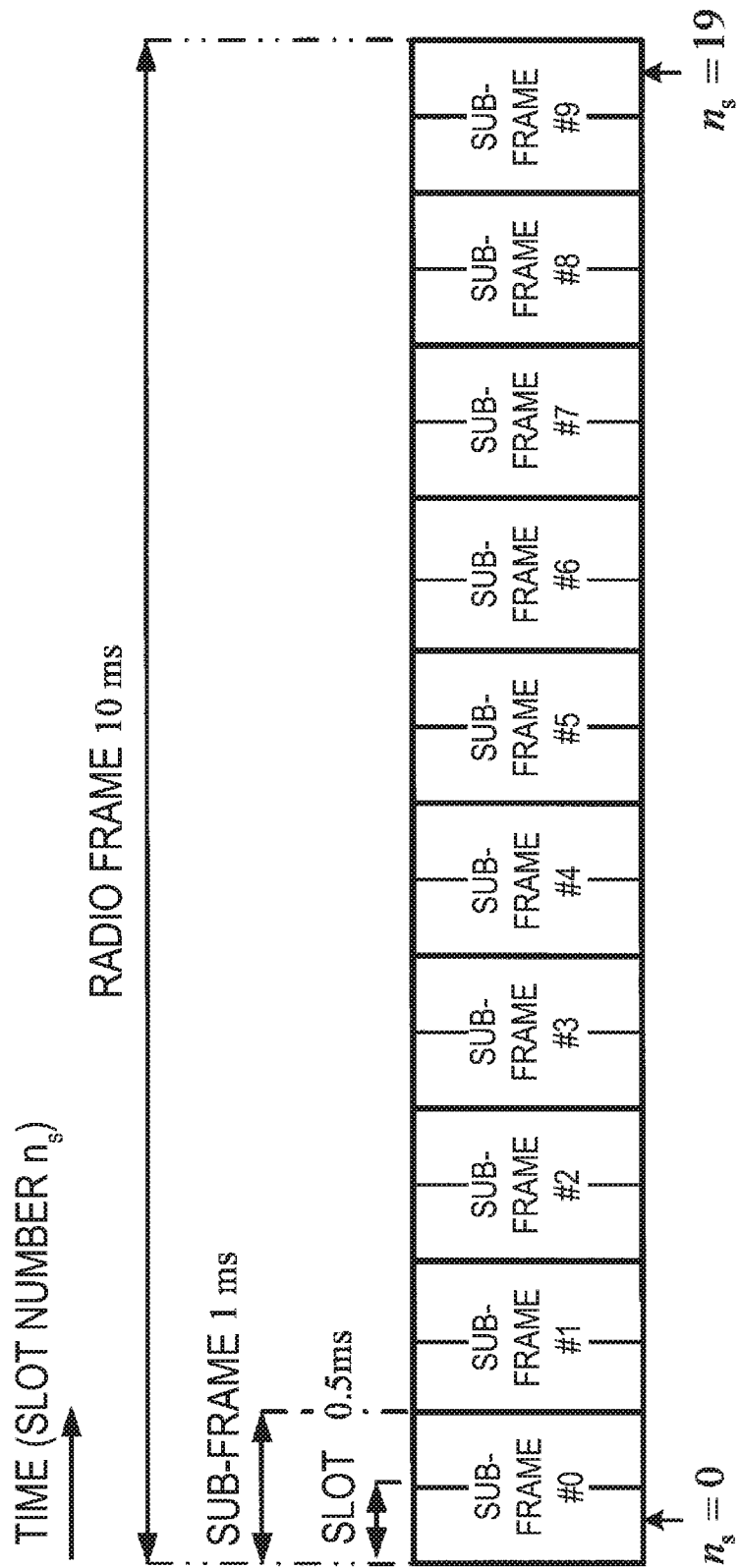
FIG. 2 is a diagram illustrating a schematic configuration of a radio frame according to the present embodiment.

An example of a configuration of the radio frame according to the present embodiment will be described below. FIG. 2 is a diagram illustrating a schematic configuration of a radio frame according to the present embodiment. Each of the radio frames is 10 ms in length. In FIG. 2, the horizontal axis is a time axis. Each of the radio frames is constituted of 10 sub-frames. Each of the sub-frames is 1 ms in length and is defined by two consecutive slots. Each of the slots is 0.5 ms in length. To be more precise, 10 sub-frames can be used at each interval of 10 ms. A sub-frame is also referred to as a Transmission Time Interval (TTI). A TTI may be 1 ms (or, 0.5 ms). On the other hand, an sTTI may be shorter than the TTI. The sTTI may be referred to as mini-slot. The sTTI may be referred to as sub-slot.

Figure 3:
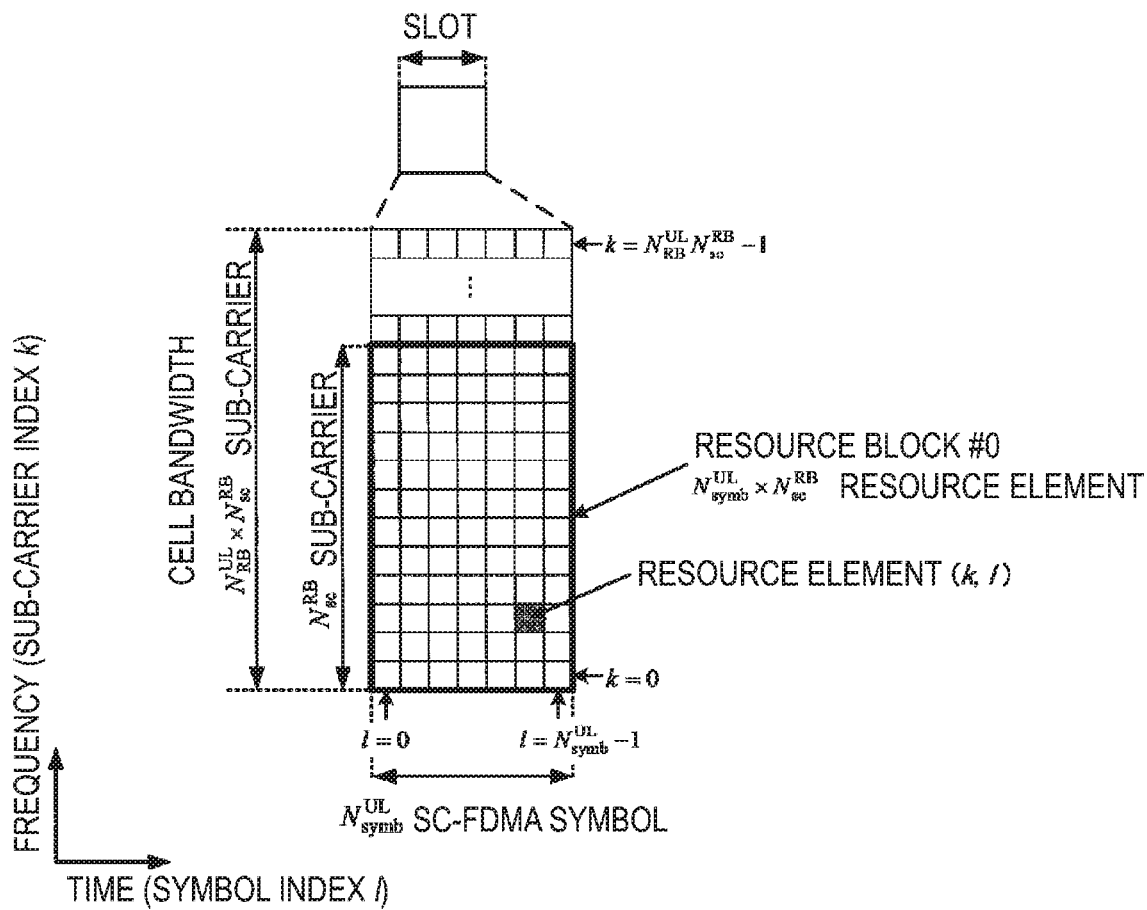
FIG. 3 is a diagram illustrating a schematic configuration of an uplink slot according to the present embodiment.

An example configuration of a slot according to the present embodiment will be described below. FIG. 3 is a diagram illustrating a schematic configuration of an uplink slot according to the present embodiment. FIG. 3 illustrates a configuration of an uplink slot in a cell. In FIG. 3, the horizontal axis is a time axis, and the vertical axis is a frequency axis. In FIG. 3, 1 is an SC-FDMA symbol number/index, and k is a sub-carrier number/index.

The physical signal or the physical channel transmitted in each of the slots is expressed by a resource grid. In uplink, the resource grid is defined by a plurality of sub-carriers and a plurality of SC-FDMA symbols. Each element within the resource grid is referred to as a resource element. The resource element is expressed by a sub-carrier number/index k and an SC-FDMA symbol number/index 1.

The uplink slot includes a plurality of SC-FDMA symbols 1 (1=0, 1, ..., $N^{UL}_{symb}$) in the time domain. $N^{UL}_{symb}$ indicates a number of SC-FDMA symbols included in one uplink slot. For a normal Cyclic Prefix (CP) in the uplink, $N^{UL}_{symb}$ is 7. For an extended CP in the uplink, $N^{UL}_{symb}$ is 6.

The terminal apparatus 1 receives the parameter UL-CyclicPrefixLength indicating a CP length in the uplink from the base station apparatus 3. The base station apparatus 3 may broadcast, in a cell, system information including the parameter UL-CyclicPrefixLength corresponding to a cell.

The uplink slot includes a plurality of sub-carriers k (k=0, 1, ..., $N^{UL}_{RB} \times N^{RB}_{SC}$) in the frequency domain. $N^{UL}_{RB}$ is an uplink bandwidth configuration for a serving cell, expressed by a multiple of $N^{RB}_{SC}$. $N^{RB}_{SC}$ is a (physical) resource block size in the frequency domain, expressed by a number of sub-carriers. A sub-carrier spacing $\Delta f$ may be 15 kHz, and $N^{RB}_{SC}$ may be 12. That is, $N^{RB}_{SC}$ may be 180 kHz. The sub-carrier spacing $\Delta f$ may differ per channel and/or per TTI/sTTI.

A resource block is used to express mapping of physical channels to resource elements. For the resource block, a virtual resource block and a physical resource block are defined. A physical channel is first mapped to a virtual resource block. Thereafter, the virtual resource block is mapped to the physical resource block. One physical resource block is defined by $N^{UL}_{symb}$-consecutive SC-FDMA symbols in the time domain and by $N^{RB}_{SC}$-consecutive sub-carriers in the frequency domain. Hence, one physical resource block is constituted by ($N^{UL}_{symb} \times N^{RB}_{SC}$) resource elements. One physical resource block corresponds to one slot in the time domain. The physical resource blocks are numbered (0, 1, ..., $N^{UL}_{RB}-1$) in ascending order of frequencies in the frequency domain.

A downlink slot according to the present embodiment includes a plurality of OFDM symbols. Since a configuration of the downlink slot according to the present embodiment is basically the same, excluding that a resource grid is defined by a plurality of sub-carriers and a plurality of OFDM symbols, a description of the configuration of the downlink slot will be omitted.

Figure 4:
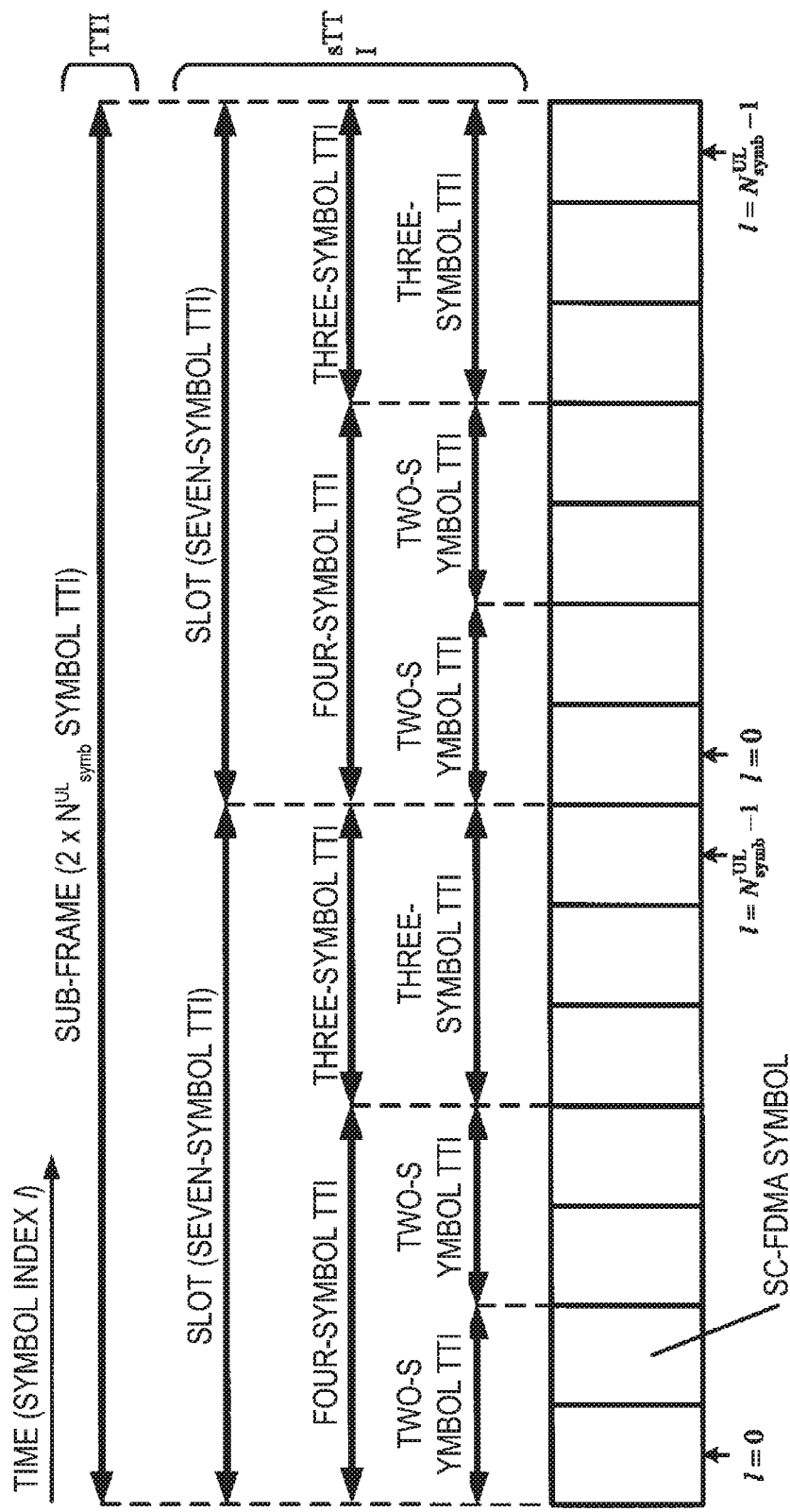
FIG. 4 is a diagram illustrating an example of a TTI and an sTTI according to the present embodiment.

FIG. 4 is a diagram illustrating an example of a TTI and an sTTI according to the present embodiment. A TTI may include $2 \times N^{UL}_{symb}$ SC-FDMA symbols. In FIG. 4, a number of SC-FDMA symbols constituting an sTTI is one of {2, 3, 4, and 7}. A TTI/sTTI including an X number of SC-FDMA symbols is also referred to as an X-symbol TTI. In the downlink, each of a TTI and an sTTI may include a plurality of OFDM symbols.

Figure 5:
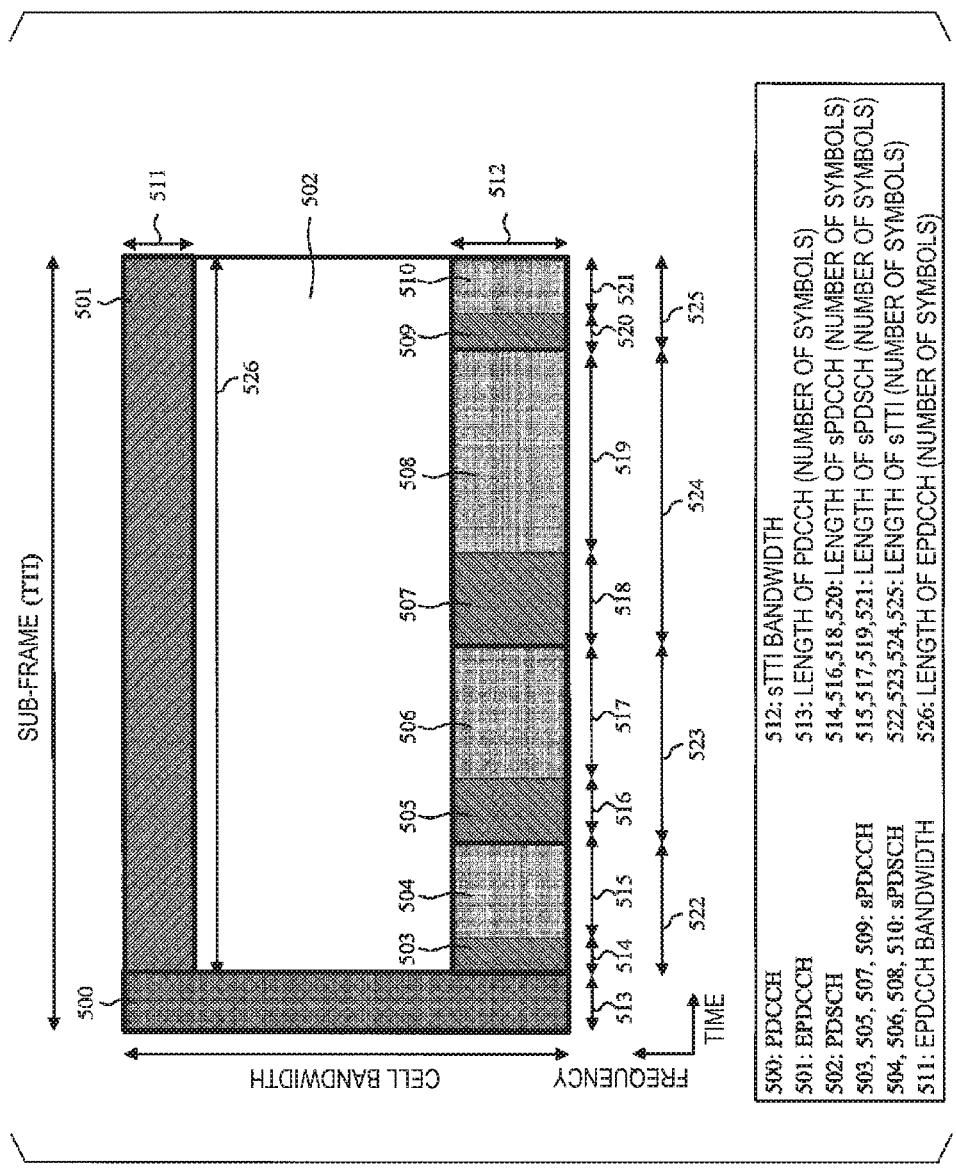
FIG. 5 is a diagram illustrating an example of allocation of physical channels in downlink according to the present embodiment.

FIG. 5 is a diagram illustrating an example of allocation of physical channels in downlink according to the present embodiment.

A length of an sPUCCH and a length of an sPUSCH may be separately controlled. A length of an sPUCCH may be determined based on information to be transmitted with the sPUCCH. A length of an sPUSCH may be determined based on information to be transmitted with the sPUSCH.

Figure 6:
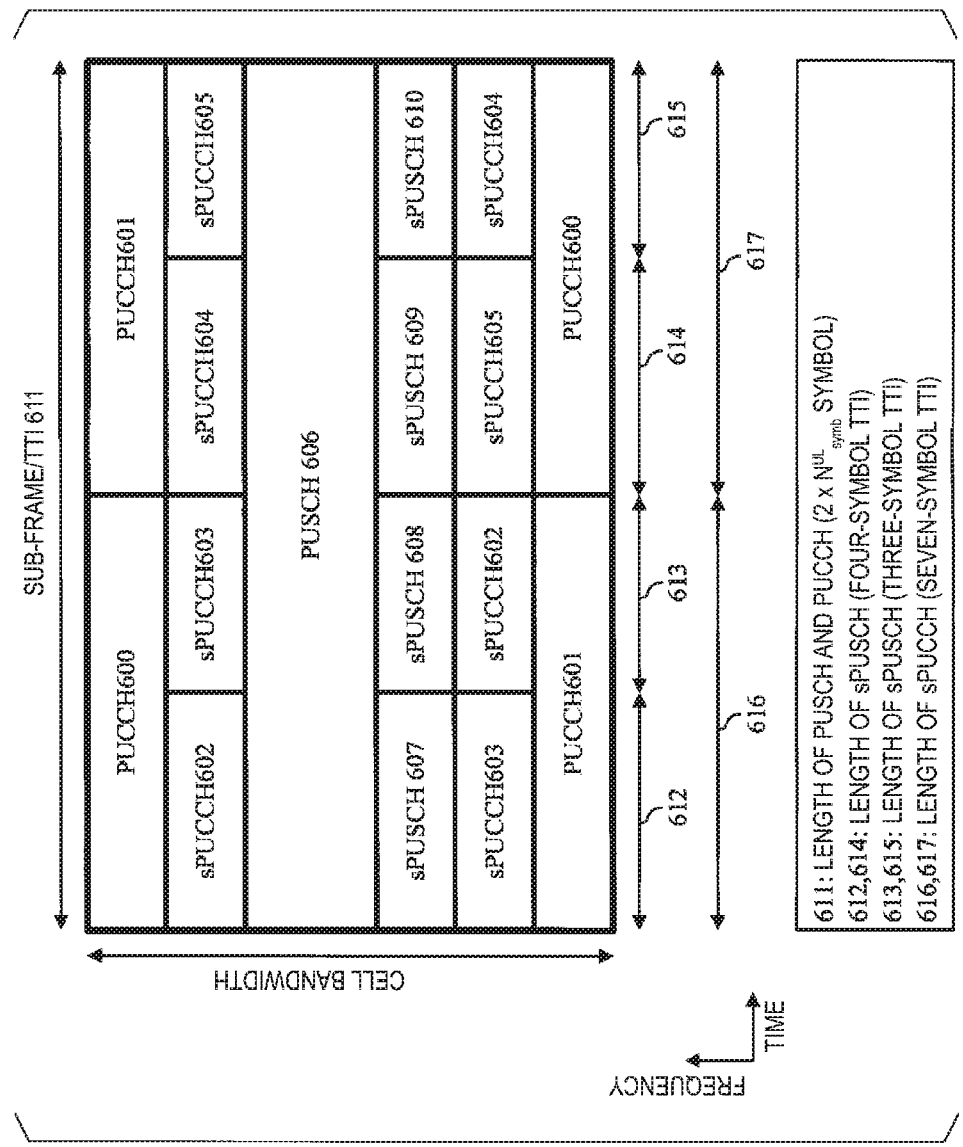
FIG. 6 is a diagram illustrating an example of allocation of physical channels in uplink according to the present embodiment.

FIG. 6 is a diagram illustrating an example of allocation of physical channels in uplink according to the present embodiment. Frequency hopping is applied to PUCCHs 600 and 601, and sPUCCHs 602 to 605. In a sub-frame/TTI, PUSCHs and PUCCHs may be mapped to $2 \times N^{UL}_{symb}$ SC-FDMA symbols. In a four-symbol TTI, sPUSCHs may be mapped to four SC-FDMA symbols. In three-symbol TTI, sPUSCHs may be mapped to three SC-FDMA symbols. In seven-symbol TTI, sPUCCHs may be mapped to seven SC-FDMA symbols. The sPUSCHs mapped to the X number of SC-FDMA symbols in an X-symbol TTI is also referred to as X-symbol sPUSCHs. The sPUCCHs mapped to the X number of SC-FDMA symbols in an X-symbol TTI is also referred to as X-symbol sPUCCHs.

A device configuration of the terminal apparatus 1 according to the present invention will be described below.

Figure 7:
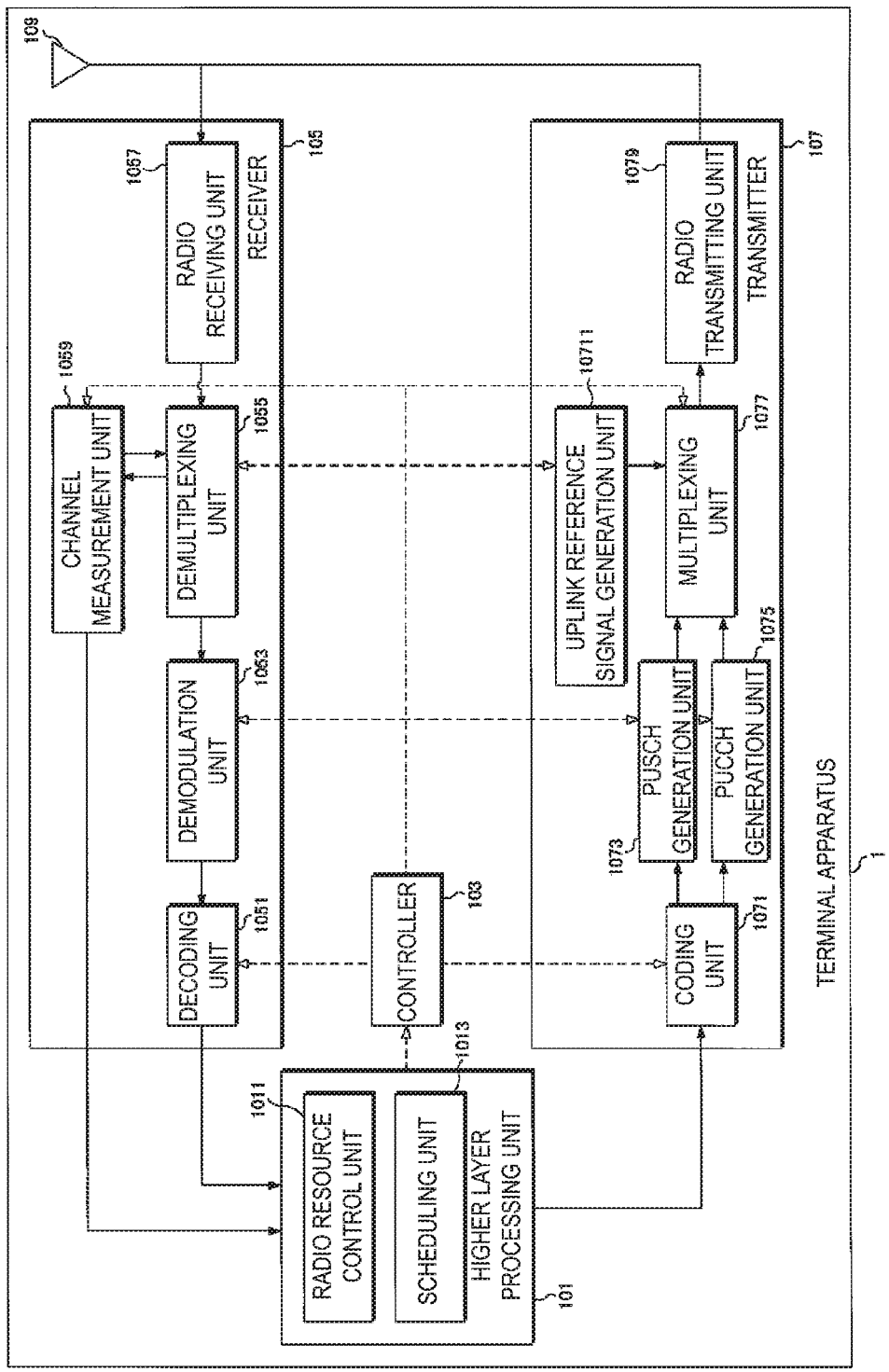
FIG. 7 is a schematic block diagram illustrating a configuration of a terminal apparatus 1 according to an aspect of the present embodiment.

FIG. 7 is a schematic block diagram illustrating a configuration of the terminal apparatus 1 according to an aspect of the present invention. As is illustrated, the terminal apparatus 1 is configured to include a higher layer processing unit 101, a controller 103, a receiver 105, a transmitter 107, and a transmit and receive antenna 109. The higher layer processing unit 101 is configured to include a radio resource control unit 1011 and a scheduling unit 1013. The receiver 105 is configured to include a decoding unit 1051, a demodulation unit 1053, a demultiplexing unit 1055, a radio receiving unit 1057, and a channel measurement unit 1059. The transmitter 107 is configured to include a coding unit 1071, a PUSCH generation unit 1073, a PUCCH generation unit 1075, a multiplexing unit 1077, a radio transmitting unit 1079, and an uplink reference signal generation unit 10711.

The higher layer processing unit 101 outputs uplink data generated through an operation performed by a user or the like, to the transmitter 107. The higher layer processing unit 101 performs processing of the Medium Access Control (MAC) layer, the Packet Data Convergence Protocol (PDCP) layer, the Radio Link Control (RLC) layer, and the Radio Resource Control (RRC) layer. Furthermore, the higher layer processing unit 101 generates control information for controlling the receiver 105 and the transmitter 107 based on downlink control information, for example, received with a PDCCH, and outputs the generated control information to the controller 103.

The radio resource control unit 1011 included in the higher layer processing unit 101 manages various pieces of configuration information of the terminal apparatus 1 itself. For example, the radio resource control unit 1011 manages serving cells being configured. Furthermore, the radio resource control unit 1011 generates information to be mapped to each uplink channel, and outputs the generated information to the transmission unit 107. In a case that downlink data being received is decoded successfully, the radio resource control unit 1011 generates an ACK and outputs the ACK to the transmitter 107. In a case that decoding of downlink data being received is failed, the radio resource control unit 1011 generates a NACK and outputs the NACK to the transmitter 107.

The scheduling unit 1013 included in the higher layer processing unit 101 stores downlink control information received via the receiver 105. The scheduling unit 1013 controls the transmitter 107 via the controller 103 to transmit, in the fourth sub-frame from a sub-frame in which an uplink grant is received, a PUSCH in accordance with the uplink grant being received. The scheduling unit 1013 controls the receiver 105 via the controller 103 to receive, in a sub-frame in which a downlink grant is received, a PDSCH in accordance with the downlink grant being received.

In accordance with control information originating from the higher layer processing unit 101, the controller 103 generates a control signal for controlling the receiver 105 and the transmitter 107. The controller 103 outputs the generated control signal to the receiver 105 and the transmitter 107 to control the receiver 105 and the transmitter 107.

In accordance with the control signal input from the controller 103, the receiver 105 demultiplexes, demodulates, and decodes a reception signal received from the base station apparatus 3 through the transmit and receive antenna 109, and outputs the resulting information to the higher layer processing unit 101.

The radio receiving unit 1057 orthogonally demodulates a downlink signal received via the transmit and receive antenna 109, and converts the analog signal being orthogonally demodulated into a digital signal. The radio receiving unit 1057 performs Fast Fourier Transform (FFT) on the digital signal, and extracts a signal in the frequency domain.

The demultiplexing unit 1055 demultiplexes the extracted signal into a PDCCH, a PDSCH, and a downlink reference signal. The demultiplexing unit 1055 outputs the downlink reference signal resulting from the demultiplexing to the channel measurement unit 1059.

The demodulation unit 1053 demodulates the PDCCH and the PDSCH in compliance with a modulation scheme, such as Quadrature Phase Shift Keying (QPSK), 16 Quadrature Amplitude Modulation (QAM), or 64 QAM, and outputs a result of the demodulation to the decoding unit 1051.

The decoding unit 1051 decodes downlink data, and outputs, to the higher layer processing unit 101, the downlink data resulting from the decoding. The channel measurement unit 1059 calculates a downlink channel estimate from the downlink reference signal and outputs the calculated downlink channel estimate to the demultiplexing unit 1055. The channel measurement unit 1059 calculates channel state information, and outputs the channel state information to the higher layer processing unit 101.

The transmitter 107 generates an uplink reference signal in accordance with the control signal input from the controller 103, codes and modulates uplink data and uplink control information input from the higher layer processing unit 101, multiplexes a PUCCH, a PUSCH, and the generated uplink reference signal, and transmits a result of the multiplexing to the base station apparatus 3 through the transmit and receive antenna 109.

The coding unit 1071 codes the uplink control information and the uplink data input from the higher layer processing unit 101, and outputs coded bits to the PUSCH generation unit and/or the PUCCH generation unit.

Figure 8:
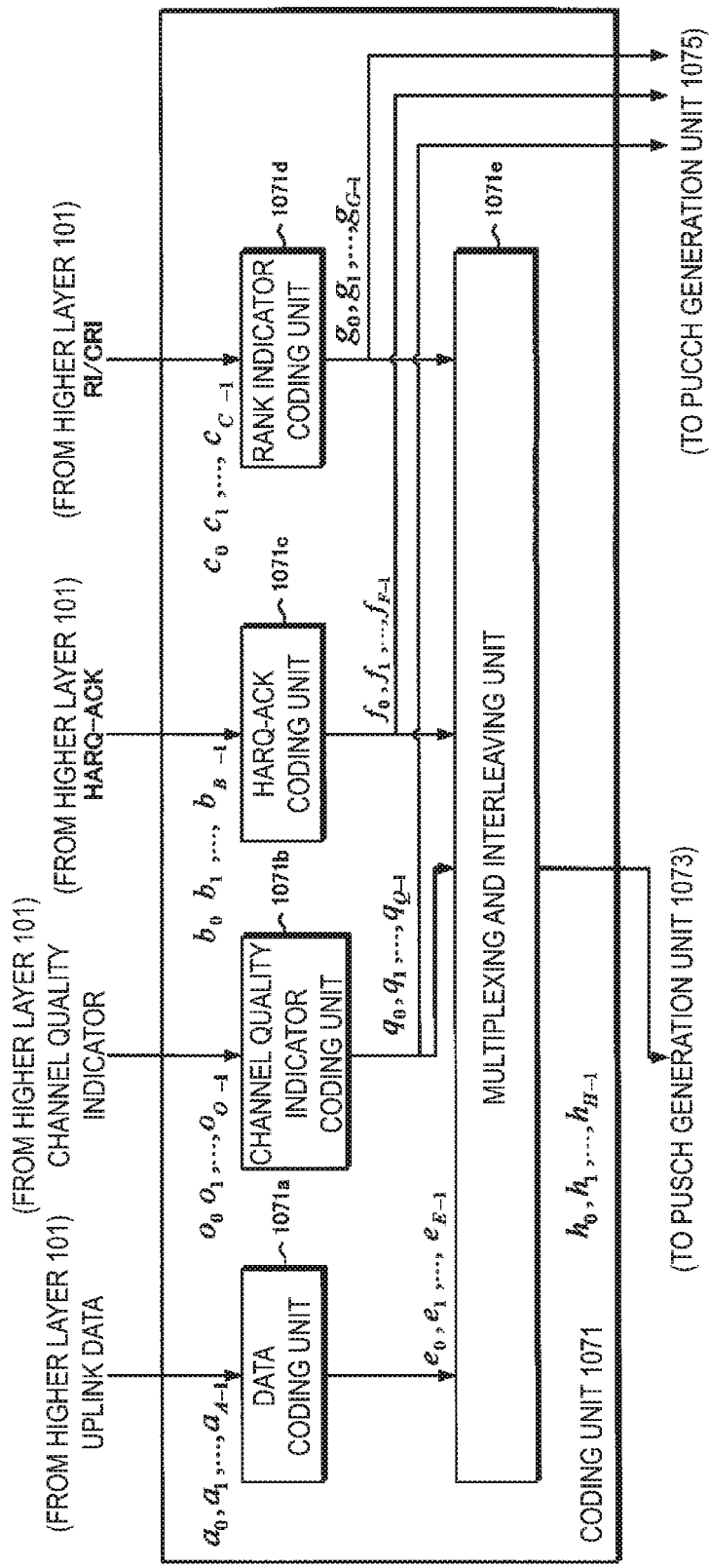
FIG. 8 is a schematic block diagram illustrating a configuration of a coding unit 1071 according to an aspect of the present embodiment.

FIG. 8 is a schematic block diagram illustrating a configuration of the coding unit 1071 according to an aspect of the present embodiment. The coding unit 1071 includes a data coding unit 1071a, a channel state information coding unit 1071b, an HARQ-ACK coding unit 1071c, an RI coding unit 1071d, and a multiplexing and interleaving unit 1071e.

The data coding unit 1071a adds CRC parity bits generated from the uplink data to uplink data a, input from the higher layer 101, applies error correction coding on the uplink data added with the CRC parity bits, and outputs a coding bit $e_i$ of the uplink data to the multiplexing and interleaving unit 1071e. A is a payload size (number of bits) of uplink data. E is a number of coding bits of uplink data.

The channel quality indicator coding unit 1071b codes a channel quality indicator $o_i$. In a case that a PUSCH is used to transmit a channel quality indicator $o_i$, the channel quality indicator coding unit 1071b outputs a coding bit $q_i$ of the channel quality indicator $o_i$ to the multiplexing and interleaving unit 1071e. In a case that a PUCCH is used to transmit a channel quality indicator $o_i$, the channel quality indicator coding unit 1071b outputs a coding bit $q_i$ of the channel quality indicator $o_i$ to the PUCCH generation unit 1075. O is a number of bits of a channel quality indicator. Q is a number of coding bits of a channel quality indicator.

The HARQ-ACK coding unit 1071c codes an HARQ-ACK $b_i$. In a case that a PUSCH is used to transmit an HARQ-ACK $b_i$, the HARQ-ACK coding unit 1071c outputs a coding bit $f_i$ of the HARQ-ACK $b_i$ to the multiplexing and interleaving unit 1071e. In a case that a PUCCH is used to transmit an HARQ-ACK $b_i$, the HARQ-ACK coding unit 1071c outputs a coding bit $f_i$ of the HARQ-ACK $b_i$ to the PUCCH generation unit 1075. B is a number of bits of an HARQ-ACK $b_i$. F is a number of coding bits of an HARQ-ACK $b_i$.

The RI coding unit 1071d codes an RI $c_i$. In a case that a PUSCH is used to transmit an RI $c_i$, the RI coding unit 1071d outputs a coding bit $g_i$ of the RI $c_i$ to the multiplexing and interleaving unit 1071e. In a case that a PUCCH is used to transmit an RI $c_i$, the RI coding unit 1071d outputs a coding bit $g_i$ of the RI $c_i$ to the PUCCH generation unit 1075. C is a number of bits of an RI $c_i$. G is a number of coding bits of an RI $c_i$.

The multiplexing and interleaving unit 1071e maps a coding bit $e_i$ of uplink data, a coding bit $q_i$ of channel state information, a coding bit $f_i$ of an HARQ-ACK, and/or a coding bit $g_i$ of an RI, and outputs, to the PUSCH generation unit 1073, a coding bit $h_i$ being coupled.

Figure 9:
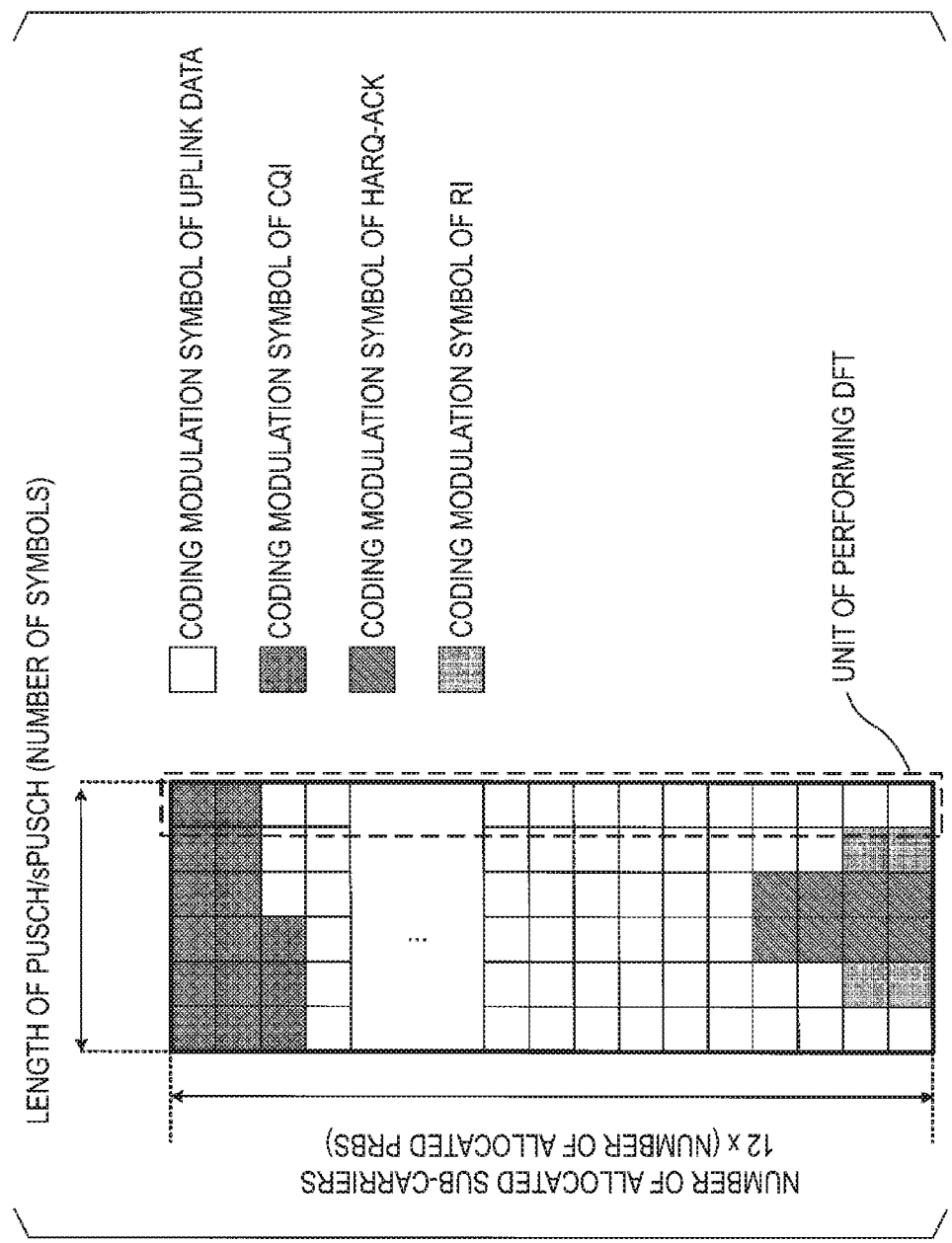
FIG. 9 is a diagram illustrating an example of a method for interleaving coded modulation symbols according to the present embodiment.

FIG. 9 is a diagram illustrating an example of a method for mapping coded modulation symbols in the multiplexing and interleaving unit 1071e according to the present embodiment. A coded modulation symbol is a group of coding bits. As a single coding symbol is modulated, a single modulation symbol is generated. In a case that a single transport block is to be mapped onto a single layer, a single coded modulation symbol includes coding bits identical in number to a modulation order $Q_m$ in compliance with a modulation scheme for uplink data. In a case that a single transport block is to be mapped onto two layers, a single coded modulation symbol includes coding bits identical in number to a value obtained through a multiplication of 2 and a modulation order $Q_m$ in compliance with a modulation scheme for uplink data.

In FIG. 9, a number of columns is identical to a number obtained by subtracting, from a number of SC-FDMA symbols to which PUSCHs/sPUSCHs are mapped, a number of SC-DMA symbols unused for a modulation symbol of uplink data and/or uplink control information. That is, in the number of columns illustrated in FIG. 9, SC-FDMA symbols used to transmit an uplink reference signal are not included.

In FIG. 9, a number of rows is identical to a number of sub-carriers of a PUSCH/sPUSCH to which allocation is provided through an uplink grant. An SC-FDMA symbol to be mapped with a PUSCH/sPUSCH may not include an SC-FDMA symbol to be mapped with an RS only.

In the PUSCH signal generation unit 1073, a plurality of modulation symbols corresponding to coded modulation symbols allocated on a single column in FIG. 9 all undergo discrete Fourier transform (DFT, or Transform Precoding). The signals having undergone DFT are respectively mapped to resource elements of a PUSCH/sPUSCH provided with an allocation of radio resources through an uplink grant. A signal at an i-th column, which is generated from a coding symbol and which has undergone DFT, is mapped on a resource element corresponding to an i-th SC-FDMA symbol.

The PUSCH generation unit 1073 modulates a coding bit $h_i$ input from the coding unit 1071, generates a modulation symbol, allows the modulation symbol to undergo DFT, generates a PUSCH/sPUSCH signal, and outputs the PUSCH/sPUSCH signal having undergone DFT to the multiplexing unit 1077. The PUSCH generation unit 1073 may not allow, to undergo DFT, a modulation symbol generated by modulating a coding bit $h_i$ input from the coding unit 1071, but may simply generate a PUSCH/sPUSCH signal.

The PUCCH generation unit 1075 generates a PUCCH/sPUCCH signal based on a coding bit $q_i$, a coding bit $f_i$, and/or a coding bit $g_i$ input from the coding unit 1071, and outputs the PUCCH/sPUCCH signal being generated to the multiplexing unit 1077.

The uplink reference signal generation unit 10711 generates an uplink reference signal, and outputs the uplink reference signal being generated to the multiplexing unit 1077.

The multiplexing unit 1075 follows a control signal input from the controller 103 to multiplex, to an uplink resource element per a transmission antenna port, a signal input from the PUSCH generation unit 1073 and/or a signal input from the PUCCH generation unit 1075, and/or an uplink reference signal input from the uplink reference signal generation unit 10711.

The radio transmitting unit 1077 performs Inverse Fast Fourier Transform (IFFT) on a signal resulting from the multiplexing, performs modulation in compliance with an SC-FDMA scheme, generates a baseband digital signal, converts the baseband digital signal into an analog signal, generates an in-phase component and an orthogonal component of an intermediate frequency from the analog signal, removes frequency components unnecessary for the intermediate frequency band, converts (up-converts) the signal of the intermediate frequency into a signal of a high frequency, removes unnecessary frequency components, performs power amplification, and outputs a final result to the transmit and receive antenna 109 for transmission.

A device configuration of the base station apparatus 3 according to the present invention will be described below.

Figure 10:
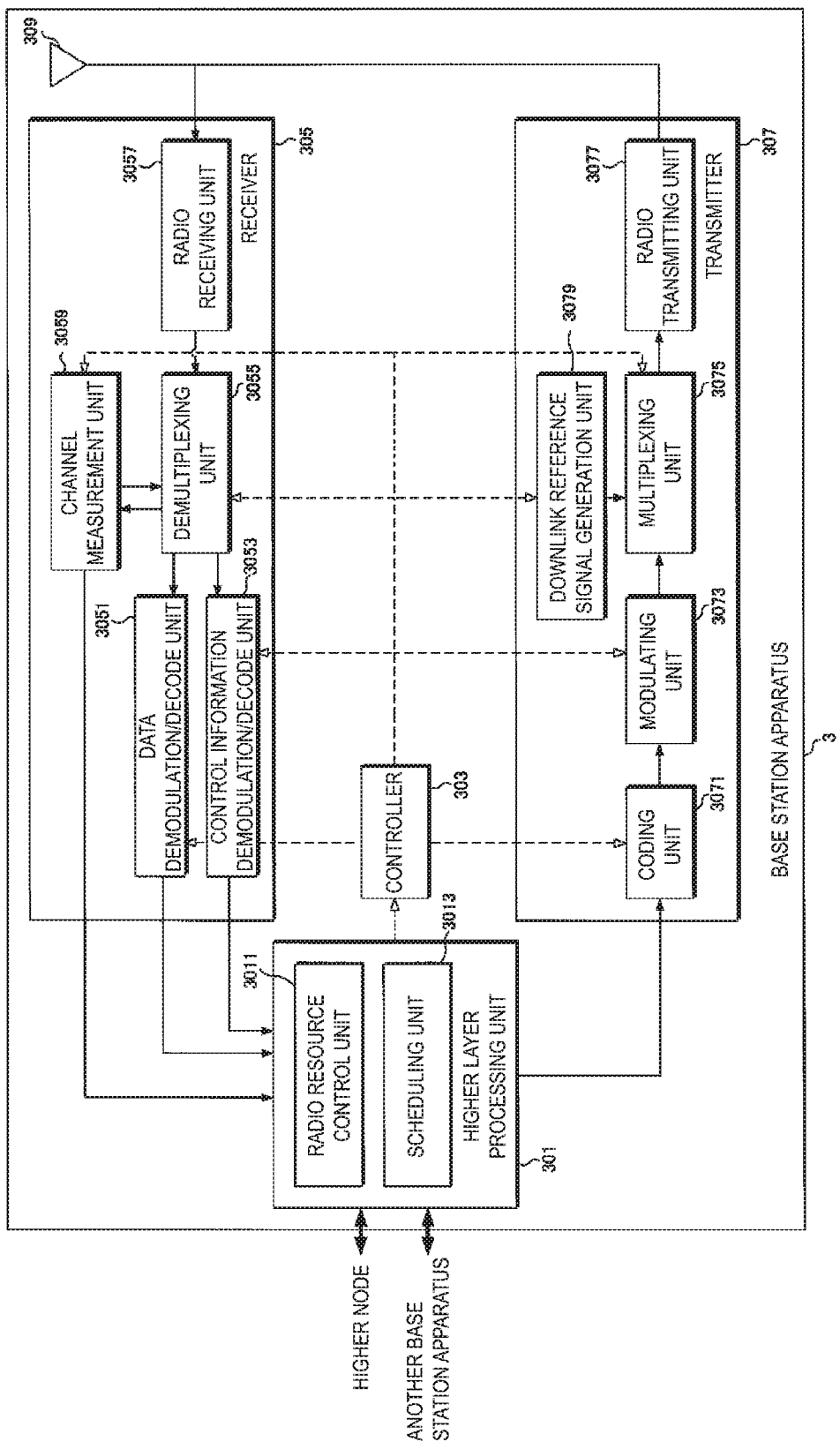
FIG. 10 is a schematic block diagram illustrating a configuration of a base station apparatus 3 according to an aspect of the present embodiment.

FIG. 10 is a schematic block diagram illustrating a configuration of the base station apparatus 3 according to an aspect of the present invention. As is illustrated, the base station apparatus 3 is configured to include a higher layer processing unit 301, a controller 303, a receiver 305, a transmitter 307, and a transmit and receive antenna 309. The higher layer processing unit 301 is configured to include a radio resource control unit 3011 and a scheduling unit 3013. The receiver 305 is configured to include a data demodulation/decode unit 3051, a control information demodulation/decode unit 3053, a demultiplexing unit 3055, a radio receiving unit 3057, and a channel measurement unit 3059. The transmitter 307 is configured to include a coding unit 3071, a modulating unit 3073, a multiplexing unit 3075, a radio transmitting unit 3077, and a downlink reference signal generation unit 3079.

The higher layer processing unit 301 performs processing of the Medium Access Control (MAC) layer, the Packet Data Convergence Protocol (PDCP) layer, the Radio Link Control (RLC) layer, and the Radio Resource Control (RRC) layer. Furthermore, the higher layer processing unit 301 generates control information for controlling the receiver 305 and the transmitter 307, and outputs the generated control information to the controller 303.

The radio resource control unit 3011 included in the higher layer processing unit 301 generates, or obtains from a higher node, downlink data mapped to a downlink PDSCH, an RRC signal, and a MAC Control Element (CE), and outputs a result of the generation or the obtainment to the scheduling unit 3013. Furthermore, the radio resource control unit 3011 manages various configuration information for each of the terminal apparatuses 1. For example, the radio resource control unit 3011 manages serving cells configured in the terminal apparatus 1.

The scheduling unit 3013 included in the higher layer processing unit 301 manages PUSCHs/sPUSCHs and radio resources of the PUCCHs/sPUCCHs to be allocated to the terminal apparatus 1. In a case that radio resources of PUSCHs/sPUSCHs are allocated to the terminal apparatus 1, the scheduling unit 3013 generates an uplink grant indicative of the allocation of the radio resources of the PUSCHs/sPUSCHs, and outputs the uplink grant being generated to the transmitter 307.

In accordance with information originating from the higher layer processing unit 301, the controller 303 generates a control signal for controlling the receiver 305 and the transmitter 307. The controller 303 outputs the generated control signal to the receiver 305 and the transmitter 307 to control the receiver 305 and the transmitter 307.

In accordance with the control signal input from the controller 303, the receiver 305 demultiplexes, demodulates, and decodes a reception signal received from the terminal apparatus 1 through the transmit and receive antenna 309, and outputs the resulting information to the higher layer processing unit 301.

The radio receiving unit 3057 orthogonally demodulates an uplink signal received via the transmit and receive antenna 309, and converts an analog signal being orthogonally demodulated into a digital signal. The radio receiving unit 3057 performs Fast Fourier Transform (FFT) on the digital signal, extracts a signal in the frequency domain, and outputs the resulting signal to the demultiplexing unit 3055.

The demultiplexing unit 1055 demultiplexes the signal input from the radio receiving unit 3057 into a PUCCH/sPUCCH, a PUSCH/sPUSCH, and a signal such as an uplink reference signal. The demultiplexing is performed based on radio resource allocation information that is determined in advance by the base station apparatus 3 using the radio resource control unit 3011 and that is included in an uplink grant notified to each of the terminal apparatuses 1. Furthermore, the demultiplexing unit 3055 makes a compensation of channels including PUCCHs/sPUCCHs and PUSCHs/sPUSCHs from a channel estimate input from the channel measurement unit 3059. Furthermore, the demultiplexing unit 3055 outputs an uplink reference signal resulting from the demultiplexing, to the channel measurement unit 3059.

The demultiplexing unit 3055 obtains, from the signals of PUCCHs/sPUCCHs and PUSCHs/sPUSCHs being demultiplexed, a modulation symbol of uplink data and a modulation symbol of uplink control information. The demultiplexing unit 3055 outputs the modulation symbol of the uplink data, which is obtained from the signals of PUSCHs/sPUSCHs, to the data demodulation/decode unit 3051. The demultiplexing unit 3055 outputs the modulation symbol of the uplink control information, which is obtained from the signals of PUCCHs/sPUCCHs or the signals of PUSCHs/sPUSCHs, to the control information demodulation/decode unit 3053.

The channel measurement unit 3059 measures a channel estimate, channel quality, and the like, based on the uplink reference signal input from the demultiplexing unit 3055, and outputs a result of the measurement to the demultiplexing unit 3055 and the higher layer processing unit 301.

The data demodulation/decode unit 3051 decodes uplink data from the modulation symbol of the uplink data, which is input from the demultiplexing unit 3055. The data demodulation/decode unit 3051 outputs the uplink data being decoded to the higher layer processing unit 301.

The control information demodulation/decode unit 3053 decodes uplink control information from the modulation symbol of the uplink control information, which is input from the demultiplexing unit 3055. The control information demodulation/decode unit 3053 outputs the uplink control information being decoded to the higher layer processing unit 301.

The transmitter 307 generates a downlink reference signal in accordance with a control signal input from the controller 303, codes and modulates downlink control information and downlink data input from the higher layer processing unit 301, multiplexes PDCCHs, PDSCHs, and the downlink reference signal, and transmits a result of the multiplexing to the terminal apparatus 1 through the transmit and receive antenna 309.

The coding unit 3071 performs coding on the downlink control information and the downlink data input from the higher layer processing unit 301. The modulating unit 3073 modulates coded bits input from the coding unit 3071, in compliance with a modulation scheme such as BPS K, QPSK, 16 QAM, or 64 QAM.

Furthermore, the downlink reference signal generation unit 3079 generates a downlink reference signal. The multiplexing unit 3075 multiplexes a modulation symbol of each channel and the downlink reference signal.

The radio transmitting unit 3077 performs Inverse Fast Fourier Transform (IFFT) on the modulation symbol resulting from the multiplexing or the like, performs modulation in compliance with an OFDM scheme, generates a baseband digital signal, converts the baseband digital signal into an analog signal, generates an in-phase component and an orthogonal component of an intermediate frequency from the analog signal, removes frequency components unnecessary for the intermediate frequency band, converts (up-converts) the signal of the intermediate frequency into a signal of a high frequency signal, removes unnecessary frequency components, performs power amplification, and outputs a final result to the transmit and receive antenna 309 for transmission.

Each of the units in the terminal apparatus 1 and the base station apparatus 3 may be constituted as a circuit.

In a case that a transmission of a PUCCH/sPUCCH and a transmission of a PUSCH are set in a single sub-frame, the terminal apparatus 1 may drop the transmission of the PUCCH/sPUCCH. In a case that a transmission of a PUCCH/sPUCCH is dropped, a PUSCH may be used to transmit uplink control information.

In a case that a transmission of a PUCCH/sPUCCH and a transmission of an sPUSCH are set in a single sub-frame, the terminal apparatus 1 may drop the transmission of the PUCCH/sPUCCH. In a case that a transmission of a PUCCH/sPUCCH is dropped, an sPUSCH may be used to transmit uplink control information.

Figure 11:
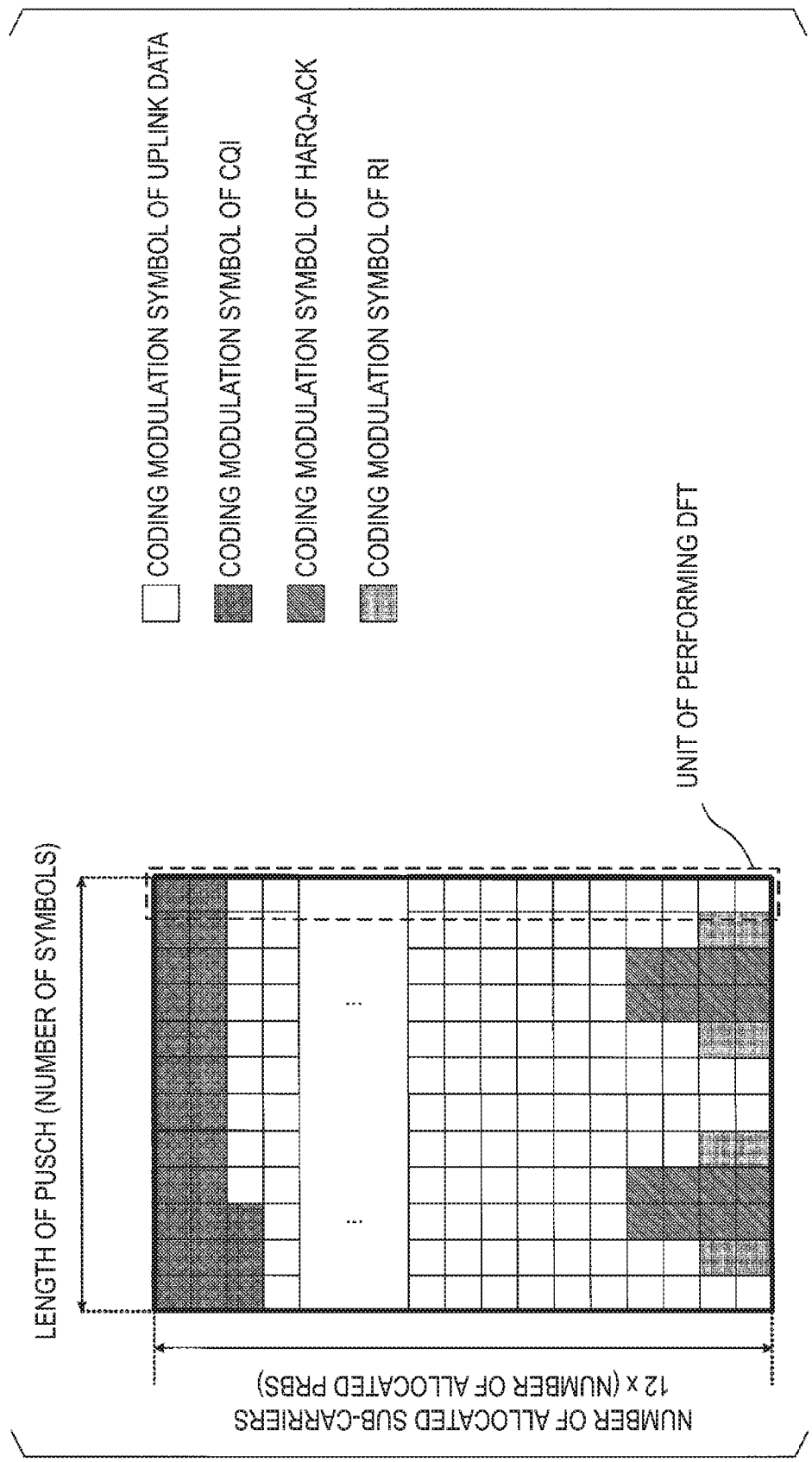
FIG. 11 is a diagram illustrating an example of mapping of data and uplink control information for a PUSCH in a multiplexing and interleaving unit 1071e according to an aspect of the present embodiment.

FIG. 11 is a diagram illustrating an example of mapping of data and uplink control information for a PUSCH in the multiplexing and interleaving unit 1071e according to an aspect of the present embodiment. Operations of the multiplexing and interleaving unit 1071e include operations 1 to 5. The operation 1 includes an operation of generating, from a coding bit $e_i$, a coded modulation symbol $j_i$. An operation of generating, from a coding bit $q_i$, a coded modulation symbol $k_i$ is further included.

Next, the operation 2 includes an operation of combining the coded modulation symbol $j_i$ and the coded modulation symbol $k_i$, and of generating a coded modulation symbol $x_i$. In the operation 1, for the coded modulation symbol $x_i$, the coded modulation symbol $k_i$ is combined in front of the coded modulation symbol $j_i$.

Next, the operation 3 includes an operation of generating, from a coding bit $f_i$, a coded modulation symbol $l_i$. The operation 3 further includes mapping of the coded modulation symbol $l_i$ at a predetermined position for the coded modulation symbol $l_i$ in a predetermined matrix. FIG. 11 illustrates an example of the predetermined matrix. FIG. 11 illustrates an example of the predetermined matrix into which coded modulation symbols are to be mapped. A predetermined position for a modulation symbol $l_i$ will be provided based on the contents described in specifications, for example. For example, in a case that a normal CP is set, predetermined positions for coded modulation symbols $l_i$ are a second column, a fifth column, an eighth column, and an eleventh column.

Next, the operation 4 includes a method for mapping coded modulation symbols $x_i$ per column in the predetermined matrix. Mapping in a column direction may denote that mapping of coded modulation symbols first proceeds in the column direction. Once the mapping reaches an end of the column, the mapping of coded modulation symbols further proceeds in a next column in the column direction. In the operation 4, no coded modulation symbol $x_i$ will be mapped at positions where the coded modulation symbols $l_i$ are already mapped.

Next, the operation 5 includes an operation of generating a coded modulation symbol $m_i$ from a coding bit $g_i$. The operation 5 further includes mapping of the coded modulation symbol $m_i$ at a predetermined position for the coded modulation symbol $m_i$. The predetermined position for a coded modulation symbol $m_i$ will be provided based on the contents described in specifications, for example. For example, in a case that a normal CP is set, the predetermined positions for coded modulation symbols $m_i$ are a third column, a fourth column, a ninth column, and tenth column. In the operation 5, in a case that other coded modulation symbols are already mapped at the predetermined positions for coded modulation symbols $m_i$, the coded modulation symbols being already mapped are punctured, and the coded modulation symbols $m_i$ are then mapped.

Figure 12:
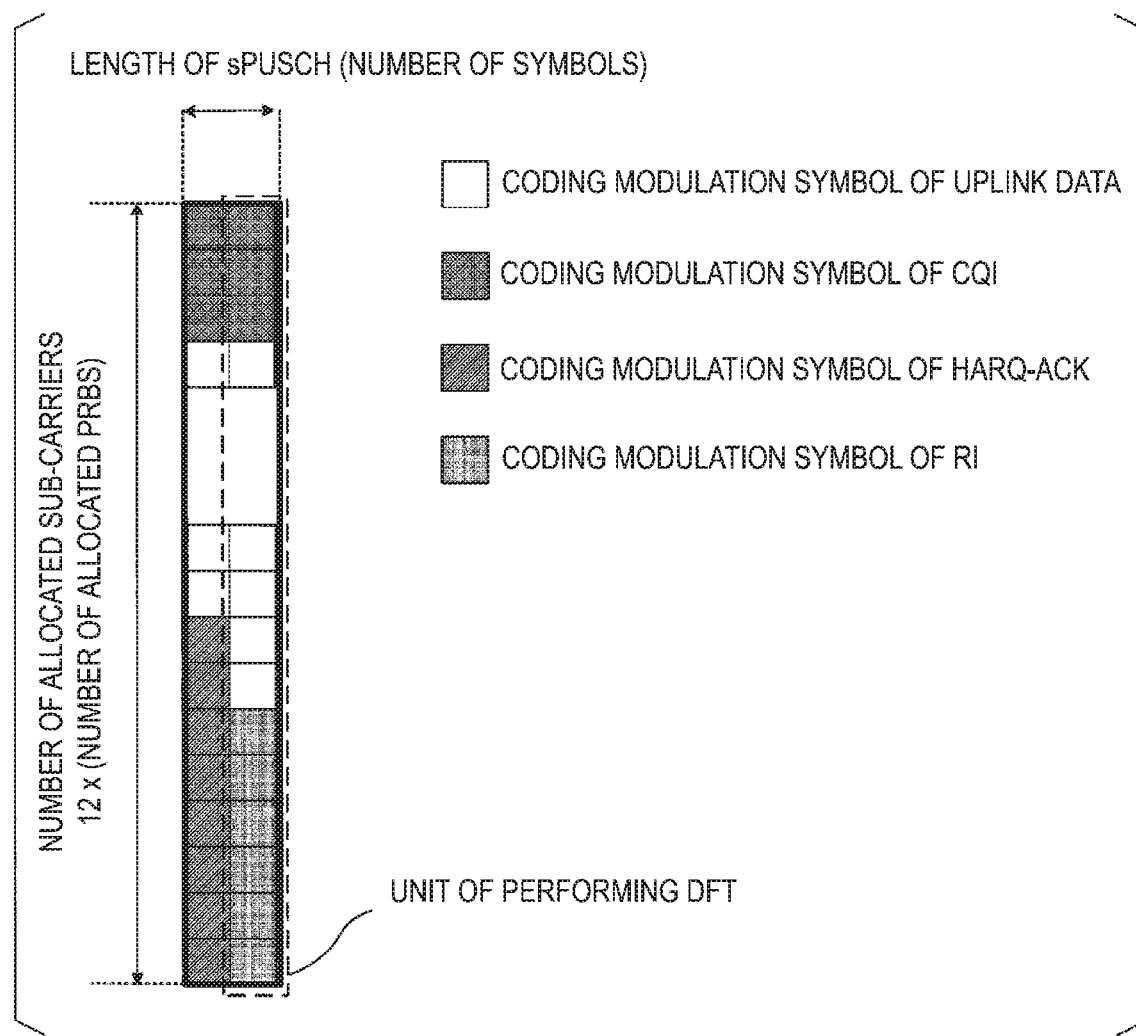
FIG. 12 is a diagram illustrating an example of mapping of data and uplink control information for an sPUSCH in the multiplexing and interleaving unit 1071e according to an aspect of the present embodiment.

FIG. 12 is a diagram illustrating an example of mapping of data and uplink control information for an sPUSCH in the multiplexing and interleaving unit 1071e according to an aspect of the present embodiment. Operations of the multiplexing and interleaving unit 1071e include at least some of the operations 1 to 5.

In the operation 4, such a method may be included that coded modulation symbols $x_i$ will not be mapped in the column direction, but will be mapped per row.

As illustrated in FIG. 12, a number of SC-FDMA symbols included in an sPUSCH is smaller than a number of SC-FDMA symbols included in a PUSCH. In a case that uplink control information is transmitted with an sPUSCH, in addition to uplink data, a coding rate for the uplink data may increase. As a result, the uplink data may not be appropriately transmitted. It is preferable that, to secure a predetermined coding rate for uplink data, or due to other reasons, a number of coded modulation symbols in uplink control information to be mapped onto an sPUSCH be changed based on predetermined conditions.

In a case that a transmission of uplink control information with an sPUSCH is triggered (or, is set, or such a trigger is provided, for example), the terminal apparatus 1 may drop, based on at least some of a first condition to a sixth condition, the transmission of at least some of the uplink control information with the sPUSCH. In a case that a transmission of uplink control information with an sPUSCH is triggered (or, is set, or such a trigger is provided, for example), the terminal apparatus 1 may drop, based on at least some of the first condition to the sixth condition, the transmission of at least some of the uplink control information, but may transmit others of the uplink control information with the sPUSCH.

Whether, in a case that a transmission of uplink control information with an sPUSCH is triggered (or, is set, or such a trigger is provided, for example), the transmission of at least some of the uplink control information with the sPUSCH is dropped based on at least some of the first condition to the sixth condition may be separately set depending on at least some of channel quality indicator and/or HARQ-ACK and/or rank indicator and/or CSI-RS resource indicator (e.g., based on higher layer signaling).

In a case that a transmission of at least some of uplink control information is dropped for a first sPUSCH, the at least some of uplink control information may be transmitted with a second sPUSCH. For example, in a case that a transmission of a channel quality indicator with a first sPUSCH is dropped, the channel quality indicator may be transmitted with a second sPUSCH. A first sPUSCH and a second sPUSCH may be allocated based on a detection of an uplink grant included in a single sub-frame. A first sPUSCH and a second sPUSCH may be allocated based on a detection of an identical uplink grant. A first sPUSCH may be a channel to be transmitted earlier than a second sPUSCH. A number of first SC-FDMA symbols for a first sPUSCH may be smaller than a number of first SC-FDMA symbols for a second sPUSCH.

In a case that a transmission of uplink control information with an sPUSCH is triggered (or, is set, or such a trigger is provided, for example), the terminal apparatus 1 may transmit, based on at least some of the first condition to the sixth condition, at least some of the uplink control information with a first sPUSCH and a second sPUSCH.

A determination of whether, in a case that a transmission of uplink control information with an sPUSCH is triggered (or, is set, or such a trigger is provided, for example), at least some of the uplink control information is transmitted with a second sPUSCH, in addition to a first sPUSCH, may be provided, based on at least some of the first condition to the sixth condition. Whether, in a case that a transmission of uplink control information with an sPUSCH is triggered (or, is set, or such a trigger is provided, for example), at least some of the uplink control information is transmitted with a second sPUSCH, in addition to a first sPUSCH, based on at least some of the first condition to the sixth condition, may be separately set depending on at least some of channel quality indicator and/or HARQ-ACK and/or rank indicator and/or CSI-RS resource indicator (e.g., based on higher layer signaling).

The first condition is whether a number of SC-FDMA symbols included in an sPUSCH is a predetermined number of SC-FDMA symbols for the sPUSCH. For example, in a case that a number of SC-FDMA symbols included in the sPUSCH is the predetermined number of SC-FDMA symbols, the terminal apparatus 1 may drop a transmission of at least some of the uplink control information. For example, the uplink control information may be a channel quality indicator. The uplink control information may be a rank indicator. The uplink control information may include a channel quality indicator and a rank indicator.

That is, for example, in a case that a number of SC-FDMA symbols included in the sPUSCH is the predetermined number of SC-FDMA symbols, the operation 2 of the multiplexing and interleaving unit 1071e may include an operation of generating a coded modulation symbol $x_i$ based solely on a coded modulation symbol $j_i$. A coded modulation symbol $j_i$ and a coded modulation symbol $x_i$ may be identical to each other.

For example, in a case that a number of SC-FDMA symbols included in the sPUSCH is the predetermined number of SC-FDMA symbols, the multiplexing and interleaving unit 1071e may not perform the operation 3.

For example, in a case that a number of SC-FDMA symbols included in the sPUSCH is the predetermined number of SC-FDMA symbols, the operation 2 of the multiplexing and interleaving unit 1071e may include an operation of generating a coded modulation symbol $x_i$ based solely on a coded modulation symbol $j_i$, as well as the multiplexing and interleaving unit 1071e may not include the operation 3.

For example, the predetermined number of SC-FDMA symbols may be 2, 3, 4, or 7. The predetermined number of SC-FDMA symbols may be 2 or smaller, 3 or smaller, 4 or smaller, or 7 or smaller.

The second condition is whether a value obtained by subtracting, from a number of SC-FDMA symbols included in an sPUSCH, a number of SC-FDMA symbols unused for uplink data (also referred to as a number of first SC-FDMA symbols) is a predetermined value for the first SC-FDMA symbol. For example, in a case that a number of first SC-FDMA symbols is the predetermined value for the first SC-FDMA symbol, the terminal apparatus 1 may drop a transmission of at least some of the uplink control information. SC-FDMA symbols that are not included for uplink data may include SC-FDMA symbols configured for a CP only.

For example, in a case that a number of first SC-FDMA symbols included in an sPUSCH is the predetermined value for the first SC-FDMA symbol, the operation 2 of the multiplexing and interleaving unit 1071e may include an operation of generating a coded modulation symbol $x_i$ based solely on a coded modulation symbol $j_i$. A coded modulation symbol $j_i$ and a coded modulation symbol $x_i$ may be identical to each other.

For example, in a case that a number of first SC-FDMA symbols for the sPUSCH is the predetermined value for the first SC-FDMA symbol, the multiplexing and interleaving unit 1071e may not include the operation 3.

For example, in a case that a number of first SC-FDMA symbols for the sPUSCH is the predetermined value for the first SC-FDMA symbol, the operation 2 of the multiplexing and interleaving unit 1071e may include an operation of generating a coded modulation symbol $x_i$ based solely on a coded modulation symbol $j_i$, and the multiplexing and interleaving unit 1071e may not include the operation 3.

For example, the predetermined value for the first SC-FDMA symbol may be 1, 2, 3, 4, 5, 6, or 7. The predetermined value for the first SC-FDMA symbol may be a value equal to or below 1, a value equal to or below 2, a value equal to or below 3, a value equal to or below 4, a value equal to or below 5, a value equal to or below 6, or a value equal to or below 7.

The third condition is whether a first value relating to a number of coded modulation symbols for uplink control information is a predetermined value (or, predetermined value or less) for the first value.

A first value may be provided based on an upper limit value of a number of coded modulation symbols for uplink control information. For example, the upper limit value of a number of coded modulation symbols may be a first upper limit value provided through a multiplication of a number of first SC-FDMA symbols $N^{PUSCH}_{symb}$ included in an sPUSCH and a number of sub-carriers $M^{PUSCH}_{SC}$ included in a resource to be allocated based on an uplink grant. The upper limit value of a number of coded modulation symbols may be a second upper limit value obtained by subtracting, from the first upper limit value, a number of coded modulation symbols for uplink control information (e.g., a number of modulation symbols $Q_{HARQ-ACK}/Q_m$ for an HARQ-ACK and/or a number of modulation symbols $Q_{RI}/Q_m$ for a rank indicator). In here, $Q_{HARQ-ACK}$ is a number of coding bits for an HARQ-ACK, $Q_{RI}$ is a number of coding bits for a rank indicator, and $Q_m$ is a modulation order in compliance with a modulation scheme used in uplink data included in an sPUSCH transmitting at least a rank indicator.

An upper limit value of a number of coded modulation symbols may be provided based on a number of coded modulation symbols for uplink control information. For example, a number of coded modulation symbols $Q'_1$ for a channel quality indicator may be provided based on an Equation 1 described below.

$$Q'_1 = \min\left( ceil\left( \frac{(O_{CQI} + L) \cdot M_{sc}^{PUSCH-initial(x)} \cdot N_{symb}^{PUSCH-initial(x)} \cdot \beta_{offset}^{PUSCH}}{\sum_{r=0}^{C_b^{(x)}-1} K_r^{(x)}} \right), M_{sc}^{PUSCH} \cdot N_{symb}^{PUSCH} - \frac{Q_{RI}^{(x)}}{Q_m^{(x)}} \right) \quad \text{Equation 1}$$

In here, min( ) is a function configured to return a minimum value among a plurality of values being entered. Also in here, Ceil(*) is a function configured to obtain a minimum integer under a condition equal to or above *. Or, Ceil(*) is a function configured to round up numbers after the decimal point in *. $O_{CQI}$ is a number of bits of a channel quality indicator. L is a number of Cyclic Redundancy Check (CRC) parity bits to be added to a channel quality indicator. $C_b^{(x)}$ is a number of code blocks. In here, x is an index of a transport block. Also, x is, among Modulation and Coding Schemes (MCSs) for a transport block, which corresponds to a first uplink grant (or, initial PDCCH) instructing a transmission of the transport block, an index corresponding to a transport block to be set with a maximum MCS. In a case that an MCS for the transport block is identical, x is set to 1. $K_r$ is a size of a code block r.

$\beta^{PUSCH}_{offset}$ is provided by $\beta^{CQI}_{offset}$. $\beta^{CQI}_{offset}$ may be provided by information/a parameter received from the base station apparatus 3.

$M^{PUSCH-initial(x)}_{sc}$ is a bandwidth scheduled for an initial transmission of a PUSCH/sPUSCH, and is obtained from an initial PDCCH for an identical transport block x. The initial transmission denotes a transmission of a PUSCH/sPUSCH, which is set by an UL grant initially detected for a transport block. $M^{PUSCH-initial(x)}_{sc}$ may be expressed by a number of sub-carriers. $N^{PUSCH-initial(x)}_{symb}$ is a number of first SC-FDMA symbols for an initial transmission of a PUSCH/sPUSCH for an identical transport block x. That is, $N^{PUSCH-initial(x)}_{symb}$ corresponds to a number of first SC-FDMA symbols for an initial transmission of a transport block x. The identical transport block x is a transport block x to be transmitted with a PUSCH together with uplink control information. $Q^{(x)}_{RI}$ is a number of coding bits of a rank indicator. $Q^{(x)}_m$ is a modulation order for a transport block x.

For example, a number of coded modulation symbols of an HARQ-ACK and/or a number of coded modulation symbols $Q'_2$ of a rank indicator may be provided based on an Equation 2 described below in a case that a number of transport blocks to be transmitted with a PUSCH/sPUSCH transmitting the HARQ-ACK or the rank indicator is 1.

$$Q'_2 = \min\left(ceil\left(\frac{O \cdot M^{PUSCH-initial}_{sc} \cdot N^{PUSCH-initial}_{symb} \cdot \beta^{PUSCH}_{offset}}{\sum_{r=0}^{C_b-1} K_r}\right), 4 \cdot M^{PUSCH}_{sc}\right)$$

Equation 2

In here, O is a number of bits of an HARQ-ACK or a number of bits of a rank indicator. $M^{PUSCH-initial}_{sc}$ is a bandwidth scheduled for an initial transmission of a PUSCH/sPUSCH, and is obtained from an initial PDCCH. $N^{PUSCH-initial}_{symb}$ is a number of first SC-FDMA symbols for an initial transmission of a PUSCH/sPUSCH for a transport block. That is, $N^{PUSCH-initial}_{symb}$ corresponds to a number of first SC-FDMA symbols for an initial transmission of a transport block. $\beta^{PUSCH}_{offset}$ is provided by $\beta^{HARQ-ACK}_{offset}$ in a case of a coded modulation symbol of an HARQ-ACK. $\beta^{PUSCH}_{offset}$ is provided by $\beta^{RI}_{offset}$ in a case of a coded modulation symbol of a rank indicator.

A number of coded modulation symbols of an HARQ-ACK and/or a number of coded modulation symbols $Q'_2$ of a rank indicator may be provided based on an Equation 3 described below in a case that a number of transport blocks to be transmitted with a PUSCH/sPUSCH transmitting the HARQ-ACK or the rank indicator is 1 or greater.

number of coded modulation symbols $Q'_1$ of a channel quality indicator, a second maximum value provided based on a number of coded modulation symbols $Q'_2$ of an HARQ-ACK, and a third maximum value provided based on a number of coded modulation symbols $Q'_2$ of a rank indicator. For example, a first maximum value may be provided based on a number of coded modulation symbols $Q'_1$ in a case that a rank indicator indicates 2. A second maximum value may be provided based on a number of serving cells set in at least the terminal apparatus 1 in a case of an FDD. For example, in a case of an FDD, a second maximum value may be provided based on $Q'_2$ in a case that O is specified with a value obtained through a multiplication of a number of serving cells set in the terminal apparatus 1 and 2 (a maximum number of transport blocks that can be transmitted with a single serving cell in a single sub-frame). A third maximum value may be provided based on a number of coded modulation symbols $Q'_2$ in a case that a rank indicator indicates 2.

For example, in a case that a first value is a predetermined value (or, predetermined value or less) for the first value, the terminal apparatus 1 may drop a transmission of at least some of the uplink control information.

For example, in a case that a first value is the predetermined value (or, predetermined value or less) for the first value, the operation 2 of the multiplexing and interleaving unit 1071e may include an operation of generating a coded modulation symbol $x_i$ based solely on a coded modulation symbol $j_i$. A coded modulation symbol $j_i$ and a coded modulation symbol $x_i$ may be identical to each other.

For example, in a case that a first value is the predetermined value (or, predetermined value or less) for the first value, the multiplexing and interleaving unit 1071e may not include the operation 3.

For example, in a case that a first value is the predetermined value (or, predetermined value or less) for the first value, the operation 2 of the multiplexing and interleaving unit 1071e may include an operation of generating a coded modulation symbol $x_i$ based solely on a coded modulation symbol $j_i$, and the multiplexing and interleaving unit 1071e may not include the operation 3.

$$Q'_2 = \max[\min(Q'_{temp}, 4 \cdot M^{PUSCH}_{sc}), Q'_{min}]$$

$$Q'_{temp} = ceil\left(\frac{O \cdot M^{PUSCH-initial(1)}_{sc} \cdot N^{PUSCH-initial(1)}_{symb} \cdot M^{PUSCH-initial(2)}_{sc} \cdot N^{PUSCH-initial(2)}_{symb} \cdot \beta^{PUSCH}_{offset}}{\sum_{r=0}^{C^{(1)}_b-1} K^{(1)}_r \cdot M^{PUSCH-initial(2)}_{sc} \cdot N^{PUSCH-initial(2)}_{symb} + \sum_{r=0}^{C^{(2)}_b-1} K^{(2)}_r \cdot M^{PUSCH-initial(1)}_{sc} \cdot N^{PUSCH-initial(1)}_{symb}}\right)$$

Equation 3

In here, max[ ] is a function configured to return a maximum value among a plurality of values being entered. $Q'_{min}$ is a value provided based on at least O. For example, in a case that O is 2 or smaller, $Q'_{min}$ is O. In a case that O ranges from 3 to 11 inclusive, $Q'_{min}$=ceil(2O/$Q'_m$) is provided. $Q'_m$ is provided with min($Q^1_m$, $Q^2_m$).

A first value may be provided based on a sum including at least some of a first maximum value provided based on a The predetermined value for the first value may be provided based on higher layer signaling or information to be transmitted by using a PDCCH. The predetermined value for the first value may be provided based on the contents described in specifications, for example.

For example, in a case that a first value is provided based on a number of coded modulation symbols of a channel quality indicator, and the first value is the predetermined value (or, predetermined value or less) for the first value, at least a transmission of the channel quality indicator and/or a rank indicator may be dropped. In a case that a first value is provided based on a number of coded modulation symbols of a channel quality indicator and a number of coded modulation symbols of a rank indicator, and the first value is the predetermined value (or, predetermined value or less) for the first value, at least a transmission of the channel quality indicator and/or the rank indicator may be dropped. In a case that a first value is provided based on a number of coded modulation symbols of a channel quality indicator, a number of coded modulation symbols of a rank indicator, and a number of coded modulation symbols of an HARQ-ACK, and the first value is the predetermined value (or, predetermined value or less) for the first value, a transmission of the channel quality indicator and/or the rank indicator and/or the HARQ-ACK may be dropped.

For example, in a case that a number of coded modulation symbols of a channel quality indicator $Q'_1$ is the predetermined value (or, predetermined value or less) for the first value, at least a transmission of the channel quality indicator and/or a rank indicator may be dropped. In a case that a sum of a number of coded modulation symbols $Q'_1$ of a channel quality indicator and a number of coded modulation symbols $Q'_{2rank}$ of a rank indicator is the predetermined value (or, predetermined value or less) for the first value, at least a transmission of the channel quality indicator and/or the rank indicator may be dropped. $Q'_{2rank}$ is a value of $Q'_2$ for a rank indicator. In a case that a sum of a number of coded modulation symbols $Q'_1$ of a channel quality indicator, a number of coded modulation symbols $Q'_{2rank}$ of a rank indicator, and a number of coded modulation symbols $Q'_{2HARQ-ACK}$ of an HARQ-ACK is the predetermined value (or, predetermined value or less) for the first value, at least a transmission of the channel quality indicator and/or the rank indicator and/or the HARQ-ACK may be dropped. A number of coded modulation symbols $Q'_{2HARQ-ACK}$ of an HARQ-ACK is a value of $Q'_2$ for an HARQ-ACK.

For example, in a case that a first maximum value provided based on a number of coded modulation symbols $Q'_1$ of a channel quality indicator is the predetermined value (or, predetermined value or less) for the first value, at least a transmission of the channel quality indicator and/or a rank indicator may be dropped. In a case that a sum of a first maximum value provided based on a number of coded modulation symbols $Q'_1$ of a channel quality indicator and a third maximum value provided based on a number of coded modulation symbols $Q'_2$ of a rank indicator is the predetermined value (or, predetermined value or less) for the first value, at least a transmission of the channel quality indicator and/or the rank indicator may be dropped. In a case that a sum of a first maximum value provided based on a number of coded modulation symbols $Q'_1$ of a channel quality indicator, a second maximum value provided based on a number of coded modulation symbols $Q'_2$ of an HARQ-ACK, and a third maximum value provided based on a number of coded modulation symbols $Q'_2$ of a rank indicator is the predetermined value for the first value, a transmission of the channel quality indicator and/or the rank indicator and/or the HARQ-ACK may be dropped.

The fourth condition is whether a number of resources for a PUSCH/sPUSCH to be allocated based on an uplink grant is a predetermined value (or, predetermined value or less) for the number of resources. The number of resources may be a number of resource blocks, or may be a number of groups of resource blocks. An example in a case that the number of resources is a number of resource blocks will be described herein.

For example, in a case that a number of resource blocks for a PUSCH/sPUSCH to be allocated based on an uplink grant is the predetermined value (or, predetermined value or less) for the number of resources, the terminal apparatus 1 may drop a transmission of at least some of uplink control information.

For example, in a case that a number of resource blocks for a PUSCH/sPUSCH to be allocated based on an uplink grant is the predetermined value (or, predetermined value or less) for the number of resources, the operation 2 of the multiplexing and interleaving unit 1071e may include an operation of generating a coded modulation symbol $x_i$ based solely on a coded modulation symbol $j_i$. A coded modulation symbol $j_i$ and a coded modulation symbol $x_i$ may be identical to each other.

For example, in a case that a number of resource blocks for a PUSCH/sPUSCH to be allocated based on an uplink grant is the predetermined value (or, predetermined value or less) for the number of resources, the multiplexing and interleaving unit 1071e may not include the operation 3.

For example, in a case that a number of resource blocks for a PUSCH/sPUSCH to be allocated based on an uplink grant is the predetermined value (or, predetermined value or less) for the number of resources, the operation 2 of the multiplexing and interleaving unit 1071e may include an operation of generating a coded modulation symbol $x_i$ based solely on a coded modulation symbol $j_i$, and the multiplexing and interleaving unit 1071e may not include the operation 3.

The predetermined value for the number of resources may be provided based on higher layer signaling or information to be transmitted by using a PDCCH. The predetermined value for the number of resources may be provided based on the contents described in specifications, for example.

The fifth condition is whether bits included in an uplink grant are triggered to drop a transmission of the uplink control information. For example, in a case that bits included in an uplink grant are triggered to drop a transmission of the uplink control information, the terminal apparatus 1 may drop a transmission of at least some of the uplink control information.

For example, in a case that bits included in an uplink grant are triggered to drop a transmission of the uplink control information, the operation 2 of the multiplexing and interleaving unit 1071e may include an operation of generating a coded modulation symbol $x_i$ based solely on a coded modulation symbol $j_i$. A coded modulation symbol $j_i$ and a coded modulation symbol $x_i$ may be identical to each other.

For example, in a case that bits included in an uplink grant are triggered to drop a transmission of the uplink control information, the multiplexing and interleaving unit 1071e may not include the operation 3.

For example, in a case that bits included in an uplink grant are triggered to drop a transmission of the uplink control information, the operation 2 of the multiplexing and interleaving unit 1071e may include an operation of generating a coded modulation symbol $x_i$ based solely on a coded modulation symbol $j_i$, and the multiplexing and interleaving unit 1071e may not include the operation 3.

The sixth condition may be provided based on at least some of a number of coded modulation symbols of uplink control information (and/or, number of bits of uplink control information) to be transmitted by using an sPUSCH, a value relating to a coding rate for uplink data to be transmitted by using the sPUSCH, and a number of resource elements included in the sPUSCH.

For example, the sixth condition may be whether a coding rate for uplink data is a predetermined coding rate or greater. A coding rate for the uplink data in the sixth condition may be provided based on a number of resources to be allocated based on an uplink grant, and a number of coded modulation symbols of uplink control information triggered to be transmitted by using an sPUSCH together with the uplink data. For example, a coding rate for the uplink data may be a value proportional to a value obtained by dividing a transport block size $X_{TBS}$ of the uplink data with a value obtained through a multiplication of a number of resource elements $X_{RE}$ used for the uplink data and a modulation order $X_{MOD}$ in compliance with a modulation scheme for the uplink data. That is, a coding rate for the uplink data may be provided based on $X_{TBS}/(X_{RE} \times X_{MOD})$. $X_{RE}$ may be provided based on a value obtained by subtracting a number of coded modulation symbols for uplink control information from a value obtained through a multiplication of a number of first SC-FDMA symbols and a number of sub-carriers to be allocated for an sPUSCH.

For example, the sixth condition may be provided based on at least a value obtained through a multiplication of a number of resource elements $N_{RE}$ used for uplink data and a first coding rate $R_{ref}$. The sixth condition may be whether a value obtained through a multiplication of a number of resource elements $N_{RE}$ used for uplink data and a first coding rate $R_{ref}$ exceeds a transport block size $X_{TBS}$ (or, A) for the uplink data. The first coding rate $R_{ref}$ may be provided based on higher layer signaling or information to be transmitted by using a PDCCH. The first coding rate $R_{ref}$ may be provided based on the contents described in specifications, for example. A number of resource elements $N_{RE}$ used for uplink data may be provided based on at least a difference between a number of resource elements included in an sPUSCH and a number of coded modulation symbols of uplink control information to be transmitted by used an sPUSCH.

For example, the sixth condition may be provided based on at least a value obtained through a multiplication of a number of coded modulation symbols of uplink control information to be transmitted by using an sPUSCH and a first coding rate. The sixth condition may be whether a value obtained through a multiplication of a number of coded modulation symbols of uplink control information to be transmitted by using an sPUSCH and a first coding rate exceeds a number of bits of the uplink control information. A number of bits of uplink control information may be provided based on a sum of at least some of a number of bits O of a channel quality indicator, a number of bits B of an HARQ-ACK, and a number of bits C of a rank indicator.

For example, in a case that a coding rate for uplink data is the predetermined coding rate or greater, the terminal apparatus 1 may drop a transmission of at least some of uplink control information.

For example, in a case that a coding rate for uplink data is the predetermined coding rate or greater, the operation 2 of the multiplexing and interleaving unit 1071e may include an operation of generating a coded modulation symbol $x_i$ based solely on a coded modulation symbol $j_i$, and the multiplexing and interleaving unit 1071e may not include the operation 3.

For example, in a case that a coding rate for uplink data is the predetermined coding rate or greater, the multiplexing and interleaving unit 1071e may not include the operation 3.

For example, in a case that a coding rate for uplink data is the predetermined coding rate or greater, the operation 2 of the multiplexing and interleaving unit 1071e may include an operation of generating a coded modulation symbol $x_i$ based solely on a coded modulation symbol $j_i$, and the multiplexing and interleaving unit 1071e may not include the operation 3.

The predetermined coding rate may be provided based on higher layer signaling or information to be transmitted by using a PDCCH. The predetermined coding rate may be provided based on the contents described in specifications, for example. The predetermined coding rate may be separately set for an HARQ-ACK, a rank indicator, and a channel quality indicator.

In a case that an sPUSCH is used to transmit uplink control information, a number of coded modulation symbols of at least some of the uplink control information is provided based on at least either of a first method and a second method. In a case that an sPUSCH is used to transmit uplink control information, whether a number of coded modulation symbols of at least some of the uplink control information is provided based on either of the first method and the second method may be determined based on at least some of a seventh condition to a twelfth condition. The seventh condition to the twelfth condition will be described later.

Whether a number of coded modulation symbols of at least some of uplink control information is provided with the first method or the second method may be separately set for at least some of a channel quality indicator and/or an HARQ-ACK and/or a rank indicator and/or a CSI-RS resource indicator (e.g., based on higher layer signaling).

The first method for a coded modulation symbol of a channel quality indicator is provided based on the Equation 1. The first method for an HARQ-ACK and/or a rank indicator is provided based on the Equation 2 in a case that a number of transport blocks to be transmitted with a PUSCH/sPUSCH transmitting the HARQ-ACK or the rank indicator is 1. The first method for an HARQ-ACK and/or a rank indicator is provided based on the Equation 3 in a case that a number of transport blocks to be transmitted through a PUSCH/sPUSCH transmitting the HARQ-ACK or the rank indicator is 1 or greater.

For example, the second method for a coded modulation symbol of a channel quality indicator is provided based on the Equation 1, and is a method for providing $\beta^{PUSCH}_{offset}$ having a value different from a value of $\beta^{CQI}_{offset}$. A value different from a value of $\beta^{CQI}_{offset}$ may be a value to be notified through higher layer signaling (or, PDCCH, for example) for a transmission of a channel quality indicator by using an sPUSCH, for example.

For example, the second method for a coded modulation symbol of a channel quality indicator is a method provided based on the Equation 1, where $\beta^{PUSCH}_{offset}$ is provided based on $\beta^{CQI}_{offset}$, and a value of $\beta^{CQI}_{offset}$ is set to a value varying between a case where a PUSCH is used to transmit a channel quality indicator and a case where an sPUSCH is used to transmit a channel quality indicator. FIG. 13 is an example of values of $\beta^{CQI}_{offset}$, according to an aspect of the present embodiment. In FIG. 11, $I^{CQI}_{offset}$ is an index to be notified through higher layer signaling. Each index is set with $\beta^{CQI}_{offset}$ for a PUSCH and $\beta^{CQI}_{offset}$ for an sPUSCH. $\beta^{CQI}_{offset}$ for at least some of PUSCHs and $\beta^{CQI}_{offset}$ for at least some of sPUSCHs may be identical to each other in value.

For example, the second method for a coded modulation symbol of a channel quality indicator may be provided based on an Equation 4 described below.

$$Q'_1 = \min\left(ceil\left(\frac{(O_{CQI} + L) \cdot M_{sc}^{PUSCH-initial(x)} \cdot N_{symb}^{PUSCH-initial(x)} \cdot \beta_{offset}^{PUSCH}}{\sum_{r=0}^{C_b^{(x)}-1} K_r^{(x)}}\right), X_{CQI}^{max}\right) \quad \text{Equation 4}$$

$X^{max}_{CQI}$ is a set value provided for the second method for a coded modulation symbol of a channel quality indicator. For example, $X^{max}_{CQI} = M^{PUSCH}_{SC} \cdot N^{PUSCH}_{symb} - Q^{(x)}_{RI} / Q^{(x)}_m - Y_{CQI}$ may also be available. $Y_{CQI}$ may be provided based on higher layer signaling or information to be transmitted by using a PDCCH. $Y_{CQI}$ may be provided based on the contents described in specifications, for example.

For example, the second method for a coded modulation symbol of a channel quality indicator may be provided based on an Equation 5 described below.

$$Q'_1 = \max[Q_{temp}^{CQI}, Q^{CQI}_{min}] \quad \text{Equation 5}$$

$Q^{CQI}_{temp}$ may be substituted by $Q'_1$ provided based on the Equation 1 or the Equation 4. $Q^{CQI}_{min}$ may be provided based on at least a number of layers. $Q^{CQI}_{min}$ may be provided based on a number of layers onto which uplink data is to be mapped. In a case that a number of layers onto which uplink data is to be mapped is $N_L$, and in a case that at least $O_{CQI}$ is a predetermined value, $Q^{CQI}_{min} = \text{ceil}(O_{CQI}/N_L)$ may also be available. The predetermined value may be a value equal to or below 2, for example.

For example, the second method for a coded modulation symbol of an HARQ-ACK is provided based on the Equation 2 or the Equation 3, and is a method for providing $\beta^{PUSCH}_{offset}$ having a value different from a value of $\beta^{HARQ-ACK}_{offset}$. A value different from a value of $\beta^{HARQ-ACK}_{offset}$ may be a value to be notified through higher layer signaling (or, PDCCH, for example) for a transmission of a channel quality indicator by using an sPUSCH, for example.

For example, the second method for a coded modulation symbol of an HARQ-ACK is a method provided based on the Equation 2 or the Equation 3, where $\beta^{PUSCH}_{offset}$ is provided based on $\beta^{HARQ-ACK}_{offset}$, and a value of $\beta^{HARQ-ACK}_{offset}$ is set to a value varying between a case where a PUSCH is used to transmit a channel quality indicator and a case where an sPUSCH is used to transmit a channel quality indicator.

For example, the second method for a coded modulation symbol of an HARQ-ACK may be provided based on an Equation 5 or an Equation 6 described below.

contents described in specifications, for example. $X^{max}_{HARQ-ACK} = K_{HARQ-ACK} \cdot M^{PUSCH}_{SC} - Y_{HARQ-ACK}$ may also be available. $K_{HARQ-ACK}$ may correspond to a number of SC-FDMA symbols to be mapped with coded modulation symbols of an HARQ-ACK. $X^{max}_{HARQ-ACK} = K_{HARQ-ACK} \cdot M^{PUSCH}_{SC}$ may also be available.

For example, the second method for a coded modulation symbol of an HARQ-ACK may be provided based on an Equation 8 described below in a case that a number of transport blocks to be transmitted with a PUSCH/sPUSCH transmitting the HARQ-ACK is 1.

$$Q'_2 = \max[Q^{HARQ-ACK}_{temp}, Q^{HARQ-ACK}_{min}] \quad \text{Equation 8}$$

$Q^{HARQ-ACK}_{temp}$ may be substituted by $Q'_2$ provided based on the Equation 2, the Equation 3, the Equation 6, or the Equation 7. $Q^{HARQ-ACK}_{min}$ may be provided based on $O_{HARQ-ACK}$.

The second method for a coded modulation symbol of an HARQ-ACK may be a method for calculating a number of bits O of an HARQ-ACK, which relates to the Equation 2, the Equation 3, the Equation 6, or the Equation 7. For example, the second method for a coded modulation symbol of an HARQ-ACK may be a method for providing a number of bits O of an HARQ-ACK based on HARQ-ACK bundling. The HARQ-ACK bundling may be an operation of performing a logical multiplication on a plurality of HARQ-ACKs. The HARQ-ACK bundling may be an operation of performing a logical multiplication on HARQ-ACKs of indexes x of transport blocks. The HARQ-ACK bundling may be an operation of performing a logical multiplication on HARQ-ACKs across sub-frames. The HARQ-ACK bundling may be an operation of performing a logical multiplication on HARQ-ACKs across serving cells, or across frequency domains or frequency resources. An operation of performing a logical multiplication on HARQ-ACKs across at least sub-frames is also referred to as time domain bundling. An operation of performing a logical multiplication on HARQ-ACKs across at least serving cells is also referred to as frequency bundling. The HARQ-ACK bundling may be an operation of performing a logical multipli- $$Q'_2 = \min\left(ceil\left(\frac{O \cdot M_{sc}^{PUSCH-initial} \cdot N_{symb}^{PUSCH-initial} \cdot \beta_{offset}^{PUSCH}}{\sum_{r=0}^{C_b-1} K_r}\right), X^{HARQ-ACK}\right) \quad \text{Equation 6}$$

$$Q'_2 = \max[\min(Q'_{temp}, X^{HARQ-ARK}), Q'_{min}] \quad \text{Equation 7}$$

$$Q'_{temp} = ceil\left(\frac{O \cdot M_{sc}^{PUSCH-initial(1)} \cdot N_{symb}^{PUSCH-initial(1)} \cdot M_{sc}^{PUSCH-initial(2)} \cdot N_{symb}^{PUSCH-initial(2)} \cdot \beta_{offset}^{PUSCH}}{\sum_{r=0}^{C_b^{(1)}-1} K_r^{(1)} \cdot M_{sc}^{PUSCH-initial(2)} \cdot N_{symb}^{PUSCH-initial(2)} + \sum_{r=0}^{C_b^{(2)}-1} K_r^{(2)} \cdot M_{sc}^{PUSCH-initial(1)} \cdot N_{symb}^{PUSCH-initial(1)}}\right)$$

$X^{max}_{HARQ-ACK}$ is a set value provided for the second method for a coded modulation symbol of an HARQ-ACK. For example, $X^{max}_{HARQ-ACK} = 4 \cdot M^{PUSCH}_{SC} - Y_{HARQ-ACK}$ may also be available. $Y_{HARQ-ACK}$ may be provided based on higher layer signaling or information to be transmitted by using a PDCCH. $Y_{HARQ-ACK}$ may be provided based on the cation on all HARQ-ACKs. An operation of performing a logical multiplication on all HARQ-ACKs is also referred to as full bundling.

For example, the first method for a coded modulation symbol of an HARQ-ACK may be a method for providing a number of bits O of an HARQ-ACK based on HARQ- ACK multiplexing. The HARQ-ACK multiplexing may be an operation of performing a logical multiplication on HARQ-ACKs across codewords. An operation of performing a logical multiplication on HARQ-ACKs across at least indexes of codewords is also referred to as spatial multiplexing.

The second method for a coded modulation symbol for a rank indicator is identical to the second method for a coded modulation symbol of an HARQ-ACK. The second method for a coded modulation symbol for a rank indicator may be provided by reading "HARQ-ACK" in the second method for a coded modulation symbol of an HARQ-ACK as "RI".

The seventh condition is whether a number of SC-FDMA symbols included in a TTI of an sPUSCH is a predetermined number of SC-FDMA symbols for the sPUSCH. For example, in a case that a number of SC-FDMA symbols included in an sPUSCH is the predetermined number of SC-FDMA symbols, the terminal apparatus 1 may use the second method for a coded modulation symbol of uplink control information. In a case that a number of SC-FDMA symbols included in an sPUSCH differs from the predetermined number of SC-FDMA symbols, the terminal apparatus 1 may use the first method for a coded modulation symbol of uplink control information.

The eighth condition is whether a value (also referred to as a number of first SC-FDMA symbols) obtained by subtracting a number of SC-FDMA symbols unused for uplink data from a number of SC-FDMA symbols included in an sPUSCH is the predetermined value for the first SC-FDMA symbol. For example, in a case that a number of first SC-FDMA symbols is the predetermined value for the first SC-FDMA symbol, the terminal apparatus 1 may use the second method for a coded modulation symbol of uplink control information. In a case that a number of first SC-FDMA symbols differs from the predetermined value for the first SC-FDMA symbol, the terminal apparatus 1 may use the first method for a coded modulation symbol of uplink control information.

The ninth condition is whether a first value relating to a number of coded modulation symbols for uplink control information is a predetermined value for the first value. A number of the coded modulation symbols may be provided based on the first method. For example, in a case that a first value relating to a number of coded modulation symbols for uplink control information is the predetermined value for the first value, the terminal apparatus 1 may use the first method for a number of coded modulation symbols of uplink control information to be transmitted by using an sPUSCH. In a case that a first value relating to a number of coded modulation symbols for uplink control information differs from the predetermined value for the first value, the terminal apparatus 1 may use the second method for a number of coded modulation symbols of uplink control information to be transmitted by using an sPUSCH.

The tenth condition is whether a number of resources for a PUSCH/sPUSCH to be allocated based on an uplink grant is a predetermined value (or, predetermined value or less) for the number of resources. The number of resources may be a number of resource blocks, or may be a number of groups of resource blocks. An example in a case that the number of resources is a number of resource blocks will be described herein.

For example, in a case that a number of resource blocks for a PUSCH/sPUSCH to be allocated based on an uplink grant is the predetermined value (or, predetermined value or less) for the number of resources, the terminal apparatus 1 may use the second method for a coded modulation symbol of uplink control information. In a case that a number of resource blocks for a PUSCH/sPUSCH to be allocated based on an uplink grant differs from the predetermined value (or, predetermined value or less) for the number of resources, the terminal apparatus 1 may use the first method for a coded modulation symbol of uplink control information.

The eleventh condition is whether bits included in an uplink grant are triggered to use the second method to provide uplink control information. For example, in a case that bits included in an uplink grant are triggered to use the second method to provide uplink control information, the terminal apparatus may use the second method for a coded modulation symbol of uplink control information. In a case that bits included in an uplink grant are not triggered to use the second method to provide uplink control information, the terminal apparatus may use the first method for a coded modulation symbol of uplink control information.

The twelfth condition is whether a coding rate for uplink data is a predetermined coding rate or greater. In a case that a coding rate for uplink data is the predetermined coding rate or greater, the terminal apparatus 1 may use the second method for a coded modulation symbol of uplink control information. In a case that a coding rate for uplink data is below the predetermined coding rate, the terminal apparatus 1 may use the first method for a coded modulation symbol of uplink control information.

Based on at least higher layer signaling, a determination of whether HARQ-ACK bundling and HARQ-ACK Multiplexing are to be used for a PUSCH is provided. Based on at least higher layer signaling, a determination of whether either of HARQ-ACK bundling and HARQ-ACK Multiplexing is to be used for an sPUSCH may be provided. That is, based on at least higher layer signaling, a determination of whether HARQ-ACK bundling and HARQ-ACK Multiplexing are separately used for a PUSCH and an sPUSCH may be provided.

Based on at least higher layer signaling, a method for bundling PUSCHs may be provided. For sPUSCHs, a method for bundling the sPUSCHs may be provided. That is, methods for respectively bundling PUSCHs and sPUSCHs may be separately provided. The bundling methods may include at least some of time domain bundling, codeword bundling, spatial multiplexing, and full bundling.

According to the above, the terminal apparatus 1 can efficiently transmit uplink control information. According to the above, the base station apparatus 3 can efficiently receive uplink control information.

Herein describes aspects of various devices according to each aspect of the present embodiment.

(1) To accomplish the object described above, aspects of the present invention are contrived to provide the following measures. That is, a first aspect of the present invention is the terminal apparatus 1 including a receiver configured to detect an uplink grant, and a transmitter configured to transmit an sPUSCH based on the uplink grant. The sPUSCH is a channel including SC-FDMA symbols lesser than 14. The sPUSCH is used to set a transmission of uplink control information. Based on a satisfaction of at least some of a first condition to a fifth condition, a transmission of at least some of the uplink control information is dropped. The first condition is that a number of SC-FDMA symbols included in the sPUSCH is a predetermined number. The second condition is that a value obtained by subtracting, from a number of SC-FDMA symbols included in the sPUSCH, a number of the SC-FDMA symbols used for a reference signal is a predetermined value or less. The third condition is that a first value relating to a number of coded modulation symbols for the uplink control information is a predetermined value or less. The fourth condition is that a number of resource blocks for the sPUSCH to be allocated based on the uplink grant is a predetermined value or less. The fifth condition is that bits included in the uplink grant are triggered to drop a transmission of at least some of the uplink control information.

(2) In the first aspect of the present invention, the coded modulation symbols include at least some of a first coded modulation symbol to a third coded modulation symbol. The first coded modulation symbol is the coded modulation symbol for a channel quality indicator. The second coded modulation symbol is the coded modulation symbol for an HARQ-ACK. The third coded modulation symbol is the coded modulation symbol for a rank indicator. The first value is provided based on a sum of at least some of a first upper limit value for the first coded modulation symbol, a second upper limit value for the second coded modulation symbol, and a third upper limit value for the third coded modulation symbol.

(3) A second aspect of the present invention is the terminal apparatus 1 including a receiver configured to detect an uplink grant, and a transmitter configured to transmit, based on the uplink grant, uplink control information by using an sPUSCH. The sPUSCH is a channel including SC-FDMA symbols lesser than 14. A number of coded modulation symbols for the uplink control information is calculated based on a first method or a second method. A determination of whether a method for calculating a number of the coded modulation symbols is the first method or the second method is provided based on at least some of a first condition to a fifth condition. The first condition is whether a number of the SC-FDMA symbols is a predetermined number. The second condition is whether a value obtained by subtracting, from a number of the SC-FDMA symbols included in the sPUSCH, a number of the SC-FDMA symbols used for a reference signal is a predetermined value or less. The third condition is whether a first value relating to a number of coded modulation symbols for the uplink control information is a predetermined value or less. The fourth condition is whether a number of resource blocks for the sPUSCH to be allocated based on the uplink grant is a predetermined value or less. The fifth condition is whether bits included in the uplink grant are triggered to drop a transmission of the uplink control information.

(4) In the second aspect of the present invention, the first uplink control information includes at least a channel quality indicator. The first value is a number of the coded modulation symbols to be provided based on the first method. In a case that the first value is the predetermined value or less, the coded modulation symbol is calculated based on the second method. The second method is provided based on a value provided based on a number of layers to be mapped with transport blocks to be transmitted by using at least the sPUSCH.

(5) A third aspect of the present invention is the base station apparatus 3 including a transmitter configured to transmit an uplink grant, and a receiver configured to receive an sPUSCH from the terminal apparatus 1 based on the uplink grant. The sPUSCH is a channel including SC-FDMA symbols lesser than 14. The sPUSCH is used to set a transmission of uplink control information. Based on a satisfaction of at least some of a first condition to a fifth condition, a transmission of at least some of the uplink control information is dropped. The first condition is that a number of SC-FDMA symbols included in the sPUSCH is a predetermined number. The second condition is that a value obtained by subtracting, from a number of SC-FDMA symbols included in the sPUSCH, a number of the SC-FDMA symbols used for a reference signal is a predetermined value or less. The third condition is that a first value relating to a number of coded modulation symbols for the uplink control information is a predetermined value or less. The fourth condition is that a number of resource blocks for the sPUSCH to be allocated based on the uplink grant is a predetermined value or less. The fifth condition is that bits included in the uplink grant are triggered to drop a transmission of at least some of the uplink control information.

(6) In the third aspect of the present invention, the coded modulation symbols include at least some of a first coded modulation symbol to a third coded modulation symbol. The first coded modulation symbol is the coded modulation symbol for a channel quality indicator. The second coded modulation symbol is the coded modulation symbol for an HARQ-ACK. The third coded modulation symbol is the coded modulation symbol for a rank indicator. The first value is provided based on a sum of at least some of a first upper limit value for the first coded modulation symbol, a second upper limit value for the second coded modulation symbol, and a third upper limit value for the third coded modulation symbol.

(7) A fourth aspect of the present invention is the base station apparatus 3 including a transmitter configured to transmit an uplink grant, and a receiver configured to receive uplink control information included in an sPUSCH to be transmitted from the terminal apparatus 1 based on the uplink grant. The sPUSCH is a channel including SC-FDMA symbols lesser than 14. A number of coded modulation symbols for the uplink control information is calculated based on a first method or a second method. A determination of whether a method for calculating a number of the coded modulation symbols is the first method or the second method is provided based on at least some of a first condition to a fifth condition. The first condition is whether a number of the SC-FDMA symbols is a predetermined number. The second condition is whether a value obtained by subtracting, from a number of the SC-FDMA symbols included in the sPUSCH, a number of the SC-FDMA symbols used for a reference signal is a predetermined value or less. The third condition is whether a first value relating to a number of coded modulation symbols for the uplink control information is a predetermined value or less. The fourth condition is whether a number of resource blocks for the sPUSCH to be allocated based on the uplink grant is a predetermined value or less. The fifth condition is whether bits included in the uplink grant are triggered to drop a transmission of the uplink control information.

(8) In the fourth aspect of the present invention, the first uplink control information includes at least a channel quality indicator. The first value is a number of the coded modulation symbols to be provided based on the first method. In a case that the first value is the predetermined value or less, the coded modulation symbol is calculated based on the second method. The second method is provided based on a value provided based on a number of layers to be mapped with transport blocks to be transmitted by using at least the sPUSCH.

(A1) An aspect of the present invention is the terminal apparatus 1 including a receiver configured to receive a DCI format including an uplink grant, and a transmitter configured to transmit a PUSCH or an sPUSCH based on the uplink grant. A TTI of the PUSCH is one sub-frame. A TTI of the sPUSCH is shorter in value than one slot. In a case that a transmission of a channel quality indicator is triggered in response to a transmission of the PUSCH, the uplink control information is transmitted with the PUSCH. In a case that a transmission of a channel quality indicator is triggered in response to a transmission of the sPUSCH, a transmission of the uplink control information is dropped.

(A2) Another aspect of the present invention is the base station apparatus 3 including a transmitter configured to transmit a DCI format including an uplink grant, and a receiver configured to receive a PUSCH or an sPUSCH to be transmitted based on the uplink grant. A TTI of the PUSCH is one sub-frame. A TTI of the sPUSCH is shorter in value than one slot. In a case that a transmission of a channel quality indicator is triggered in response to a transmission of the PUSCH, the uplink control information is transmitted with the PUSCH. In a case that a transmission of a channel quality indicator is triggered in response to a transmission of the sPUSCH, a transmission of the uplink control information is dropped.

(A3) Still another aspect of the present invention is a communication method used for the terminal apparatus 1, including receiving a DCI format including an uplink grant, and transmitting a PUSCH or an sPUSCH based on the uplink grant. A TTI of the PUSCH is one sub-frame. A TTI of the sPUSCH is shorter in value than one slot. In a case that a transmission of a channel quality indicator is triggered in response to a transmission of the PUSCH, the uplink control information is transmitted with the PUSCH. In a case that a transmission of a channel quality indicator is triggered in response to a transmission of the sPUSCH, a transmission of the uplink control information is dropped.

(A4) Still another aspect of the present invention is a communication method used for the base station apparatus 3, including transmitting a DCI format including an uplink grant, and receiving a PUSCH or an sPUSCH to be transmitted based on the uplink grant. A TTI of the PUSCH is one sub-frame. A TTI of the sPUSCH is shorter in value than one slot. In a case that a transmission of a channel quality indicator is triggered in response to a transmission of the PUSCH, the uplink control information is transmitted with the PUSCH. In a case that a transmission of a channel quality indicator is triggered in response to a transmission of the sPUSCH, a transmission of the uplink control information is dropped.

Each of programs running on the base station apparatus 3 and the terminal apparatus 1, according to an aspect of the present invention, may be a program that controls a Central Processing Unit (CPU) and the like, such that the program causes a computer to operate in such a manner as to realize the functions of the above-described embodiment according to the aspect of the present invention. The information handled in these devices is temporarily stored in a Random Access Memory (RAM) while being processed. Thereafter, the information is stored in various types of Read Only Memory (ROM) such as a flash ROM and a Hard Disk Drive (HDD), and when necessary, is read by the CPU to be modified or rewritten.

Note that the terminal apparatus 1 and the base station apparatus 3 according to the above-described embodiment may be partially achieved by a computer. In that case, this configuration may be realized by recording a program for realizing such control functions on a computer-readable recording medium and causing a computer system to read the program recorded on the recording medium for execution.

Note that it is assumed that the "computer system" mentioned here refers to a computer system built into the terminal apparatus 1 or the base station apparatus 3, and the computer system includes an OS and hardware components such as a peripheral apparatus. Furthermore, the "computer-readable recording medium" refers to a portable medium such as a flexible disk, a magneto-optical disk, a ROM, a CD-ROM, and the like, and a storage apparatus such as a hard disk built into the computer system.

Moreover, the "computer-readable recording medium" may include a medium that dynamically retains a program for a short period of time, such as a communication line that is used to transmit the program over a network such as the Internet or over a communication line such as a telephone line, and may also include a medium that retains a program for a fixed period of time, such as a volatile memory within the computer system for functioning as a server or a client in such a case. Furthermore, the program may be configured to realize some of the functions described above, and also may be configured to be capable of realizing the functions described above in combination with a program already recorded in the computer system.

Furthermore, the base station apparatus 3 according to the above-described embodiment may be achieved as an aggregation (an apparatus group) constituted of multiple apparatuses. Each of the apparatuses constituting such an apparatus group may include a portion or all of each function or each functional block of the base station apparatus 3 according to the above-described embodiment. The apparatus group may include each general function or each functional block of the base station apparatus 3. Furthermore, the terminal apparatus 1 according to the above-described embodiment can also communicate with the base station apparatus as the aggregation.

Furthermore, the base station apparatus 3 according to the above-described embodiment may serve as an Evolved Universal Terrestrial Radio Access Network (EUTRAN). Furthermore, the base station apparatus 3 according to the above-described embodiment may have some or all portions of the functions of a node higher than an eNodeB.

Furthermore, some or all portions of each of the terminal apparatus 1 and the base station apparatus 3 according to the above-described embodiment may be typically achieved as an LSI which is an integrated circuit or may be achieved as a chip set. The functional blocks of each of the terminal apparatus 1 and the base station apparatus 3 may be individually achieved as a chip, or some or all of the functional blocks may be integrated into a chip. Furthermore, a circuit integration technique is not limited to the LSI, and may be realized with a dedicated circuit or a general-purpose processor. Furthermore, in a case where with advances in semiconductor technology, a circuit integration technology with which an LSI is replaced appears, it is also possible to use an integrated circuit based on the technology.

Furthermore, according to the above-described embodiment, the terminal apparatus has been described as an example of a communication apparatus, but the present invention is not limited to such a terminal apparatus, and is applicable to a terminal apparatus or a communication apparatus of a fixed-type or a stationary-type electronic apparatus installed indoors or outdoors, for example, such as an Audio-Video (AV) apparatus, a kitchen apparatus, a cleaning or washing machine, an air-conditioning apparatus, office equipment, a vending machine, and other household apparatuses.

The embodiments of the present invention have been described in detail above referring to the drawings, but the specific configuration is not limited to the embodiments and includes, for example, an amendment to a design that falls within the scope that does not depart from the gist of the present invention. Furthermore, various modifications can be made to the aspect of the present invention within the scope of the present invention defined by claims, and embodiments that are made by suitably combining technical means disclosed according to the different embodiments are also included in the technical scope of the present invention. Furthermore, a configuration in which constituent elements, described in the respective embodiments and having mutually the same effects, are substituted for one another is also included in the technical scope of the present invention.

INDUSTRIAL APPLICABILITY

An aspect of the present invention can be utilized, for example, in a communication system, communication equipment (for example, a cellular phone apparatus, a base station apparatus, a radio LAN apparatus, or a sensor device), an integrated circuit (for example, a communication chip), or a program.

REFERENCE SIGNS LIST 1 (1A, 1B, 1C) Terminal apparatus
3 Base station apparatus
101 Higher layer processing unit
103 Controller
105 Receiver
107 Transmitter
301 Higher layer processing unit
303 Controller
305 Receiver
307 Transmitter
1011 Radio resource control unit
1013 Scheduling unit
3011 Radio resource control unit
3013 Scheduling unit

The invention claimed is:

1. A terminal device comprising:
reception circuitry configured and/or programmed to receive a physical downlink control channel (PDCCH); and
transmission circuitry configured and/or programmed to transmit a physical uplink shared channel (PUSCH) scheduled by the PDCCH, the PUSCH carrying uplink control information (UCI) which comprises channel state information (CSI) including channel quality indicator (CQI), and hybrid automatic repeat request-acknowledgement (HARQ-ACK) information, wherein
a quantity of coded modulation symbols for the CQI is given at least based on a first parameter,
a quantity of coded modulation symbols for the HARQ-ACK information is given at least based on a second different parameter, and
the first and second parameters are given based on a transmission time interval (TTI) length for the PUSCH, wherein each of the first and second parameters is determined based on matching a corresponding index value received from a base station through radio resource control (RRC) signaling against a plurality of index values.

2. The terminal device of claim 1, wherein the quantity of coded modulation symbols for the CQI and the quantity of coded modulation symbols for the HARQ-ACK information determine whether to drop some of the information of the UCI in the PUSCH.

3. The terminal device of claim 2, wherein the some of the information includes at least one of the CQI or the HARQ-ACK information.

4. The terminal device of claim 1, wherein the first and second parameters are further given based on a number of transport blocks, transmitted by the PUSCH, being one.

5. A base station device comprising:
transmission circuitry configured and/or programmed to transmit a physical downlink control channel (PDCCH); and
reception circuitry configured and/or programmed to receive a physical uplink shared channel (PUSCH) scheduled by the PDCCH, wherein
uplink control information (UCI) which comprises channel state information (CSI) including channel quality indicator (CQI), and hybrid automatic repeat request-acknowledgement (HARQ-ACK) information is transmitted on the PUSCH,
a quantity of coded modulation symbols for the CQI is given at least based on a first parameter,
a quantity of coded modulation, symbols for the HARQ-ACK information is given at least based on a second different parameter, and
the first and second parameters are given based on a transmission time interval (TTI) length for the PUSCH, wherein each of the first and second parameters is determined based on matching a corresponding index value received from a base station through radio resource control (RRC) signaling against a plurality of index values.

6. The base station device of claim 5, wherein the quantity of coded modulation symbols for the CQI and the quantity of coded modulation symbols for the HARQ-ACK information determine whether to drop some of the information of the UCI in the PUSCH.

7. The base station device of claim 6, wherein the some of the information includes at least one of the CQI or the HARQ-ACK information.

8. The base station device of claim 5, wherein the first and second parameters are further given based on a number of transport blocks, transmitted by the PUSCH, being one.

9. A communication method of a terminal device comprising:
receiving a physical downlink control channel (PDCCH); and
transmitting a physical uplink shared channel (PUSCH) scheduled by the PDCCH, the PUSCH carrying uplink control information (UCI) which comprises channel state information (CSI) including channel quality indicator (CQI), and hybrid automatic repeat request-acknowledgement (HARQ-ACK) information, wherein
a quantity of coded modulation symbols for the CQI is given at least based on a first parameter,
a quantity of coded modulation symbols for the HARQ-ACK information is given at least based on a second different parameter, and
the first and second parameters are given based on a transmission time interval (TTI) length for the PUSCH, wherein each of the first and second parameters is determined based on matching a corresponding index value received from a base station through radio resource control (RRC) signaling against a plurality of index values.

10. The communication method of claim 9, wherein the quantity of coded modulation symbols for the CQI and the quantity of coded modulation symbols for the HARQ-ACK information determine whether to drop some of the information of the UCI in the PUSCH.

11. The communication method of claim 10, wherein the some of the information includes at least one of the CQI or the HARQ-ACK information.

12. The communication method of claim 9, wherein the first and second parameters are further given based on a number of transport blocks, transmitted by the PUSCH, being one.

13. A communication method of a base station device comprising:
   transmitting a physical downlink control channel (PDCCH); and
   receiving a physical uplink shared channel (PUSCH) scheduled by the PDCCH, wherein uplink control information (UCI) which comprises channel state information (CSI) including channel quality indicator (CQI), and hybrid automatic repeat request-acknowledgement (HARQ-ACK) information is transmitted on the PUSCH, wherein
   a quantity of coded modulation symbols for the CQI is given at least based on a first parameter,
   a quantity of coded modulation symbols for the HARQ-ACK information is given at least based on a second different parameter, and
   the first and second parameters are given based on a transmission time interval (TTI) length for the PUSCH, wherein each of the first and second parameters is determined based on matching a corresponding index value received from a base station through radio resource control (RRC) signaling against a plurality of index values.

14. The communication method of claim 13, wherein the quantity of coded modulation symbols for the CQI and the quantity of coded modulation symbols for the HARQ-ACK information determine whether to drop some of the information of the UCI in the PUSCH.

15. The communication method of claim 14, wherein the some of the information includes at least one of the CQI or the HARQ-ACK information.

16. The communication method of claim 13, wherein the first and second parameters are further given based on a number of transport blocks, transmitted by the PUSCH, being one.

* * * * *